United States Patent
Cothern et al.

(10) Patent No.: US 10,088,061 B2
(45) Date of Patent: Oct. 2, 2018

(54) GATE VALVES AND AIRLOCKS FOR A TRANSPORTATION SYSTEM

(71) Applicant: Hyperloop Technologies, Inc., Los Angeles, CA (US)

(72) Inventors: Kyle Cothern, Los Angeles, CA (US); Michael Gaunt, Los Angeles, CA (US); Thomas Ronacher, Del Aire, CA (US); Daniel Shafrir, Los Angeles, CA (US); Brogan Bambrogan, Los Angeles, CA (US); Joshua Giegel, Hawthorne, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/423,231

(22) Filed: Feb. 2, 2017

(65) Prior Publication Data

US 2017/0146136 A1   May 25, 2017

Related U.S. Application Data

(63) Continuation of application No. 15/007,712, filed on Jan. 27, 2016, now Pat. No. 9,599,235.
(Continued)

(51) Int. Cl.
*F16K 3/30* (2006.01)
*F16K 3/03* (2006.01)
(Continued)

(52) U.S. Cl.
CPC ............. *F16K 3/30* (2013.01); *B61B 13/10* (2013.01); *F16K 3/03* (2013.01); *F16K 3/04* (2013.01);
(Continued)

(58) Field of Classification Search
CPC ... B61B 13/10; F16K 3/30; F16K 3/08; F16K 3/12
(Continued)

(56) References Cited

U.S. PATENT DOCUMENTS

| 131,322 A | 9/1872 | Anderson |
| 2,296,771 A | 9/1942 | Crawford et al. |

(Continued)

FOREIGN PATENT DOCUMENTS

| EP | 2371613 | 10/2011 |
| WO | WO2003002370 A1 | 1/2003 |

(Continued)

OTHER PUBLICATIONS

Musk, E., "Hyperloop White Paper," dated Aug. 12, 2013.
(Continued)

*Primary Examiner* — Jason C Smith
(74) *Attorney, Agent, or Firm* — Greenblum & Bernstein, P.L.C.

(57) ABSTRACT

A system includes at least one tube forming a portion of a transportation path, wherein the tube is maintained as a low-pressure environment, a propulsion system configured to propel at least one capsule through the tube, a levitation system configured to levitate the capsule within the tube, and at least one tube sealer arranged along the at least one tube and configured to selectively create an airlock in the at least one tube.

18 Claims, 17 Drawing Sheets

Related U.S. Application Data

(60) Provisional application No. 62/242,562, filed on Oct. 16, 2015, provisional application No. 62/232,876, filed on Sep. 25, 2015, provisional application No. 62/113,511, filed on Feb. 8, 2015.

(51) Int. Cl.
  *F16K 3/04* (2006.01)
  *F16K 3/12* (2006.01)
  *F16K 7/10* (2006.01)
  *F16K 27/04* (2006.01)
  *B61B 13/10* (2006.01)

(52) U.S. Cl.
  CPC ............... *F16K 3/12* (2013.01); *F16K 7/10* (2013.01); *F16K 27/044* (2013.01)

(58) Field of Classification Search
  USPC ................................ 104/138.1, 138.2, 140
  See application file for complete search history.

(56) References Cited

U.S. PATENT DOCUMENTS

| | | | | |
|---|---|---|---|---|
| 2,488,287 | A | 11/1949 | Goddard | |
| 2,511,979 | A | 6/1950 | Goddard | |
| 2,791,633 | A | 9/1956 | Sindzinski | |
| 2,956,823 | A | 10/1960 | Benjamin, Jr. et al. | |
| 3,006,288 | A | 10/1961 | Brown | |
| 3,083,528 | A | 4/1963 | Brown | |
| 3,100,454 | A | 8/1963 | Dennis | |
| 3,132,416 | A | 5/1964 | Hait | |
| 3,233,559 | A | 2/1966 | Smith et al. | |
| 3,605,629 | A * | 9/1971 | Edwards | B61B 13/122 104/138.1 |
| 3,610,163 | A * | 10/1971 | Edwards | B61B 13/122 104/156 |
| 3,738,281 | A | 6/1973 | Waidelich | |
| 3,750,803 | A | 8/1973 | Paxton | |
| 3,768,417 | A | 10/1973 | Thornton et al. | |
| 3,776,141 | A | 12/1973 | Gelhard et al. | |
| 3,854,411 | A | 12/1974 | Lichtenberg | |
| 3,952,667 | A | 4/1976 | Kovanov et al. | |
| 3,954,064 | A | 5/1976 | Minovitch | |
| 4,015,540 | A | 4/1977 | Roxberry | |
| 4,023,500 | A * | 5/1977 | Diggs | B61B 13/10 104/138.1 |
| 4,075,948 | A | 2/1978 | Minovitch | |
| 4,108,077 | A | 8/1978 | Laing | |
| 4,148,260 | A | 4/1979 | Minovitch | |
| 4,175,414 | A | 11/1979 | Peytavin | |
| 4,202,272 | A | 5/1980 | Teodorescu et al. | |
| 4,400,655 | A | 8/1983 | Curtiss et al. | |
| 4,427,740 | A | 1/1984 | Stackhouse et al. | |
| 4,676,295 | A | 6/1987 | Samuelson | |
| 4,718,459 | A | 1/1988 | Adorjan | |
| 4,881,469 | A * | 11/1989 | Hirtz | B61B 13/10 104/138.1 |
| 5,282,424 | A * | 2/1994 | O'Neill | B61B 13/10 104/138.1 |
| 5,388,527 | A | 2/1995 | Thornton et al. | |
| 5,619,930 | A | 4/1997 | Alimanestiano | |
| 5,899,635 | A | 5/1999 | Kuja et al. | |
| 5,950,543 | A * | 9/1999 | Oster | B61B 13/10 104/130.05 |
| 6,178,892 | B1 * | 1/2001 | Harding | B60V 3/04 104/119 |
| 6,279,485 | B1 * | 8/2001 | Schlienger | B60V 3/04 104/138.1 |
| 6,311,476 | B1 | 11/2001 | Frye et al. | |
| 6,373,153 | B1 | 4/2002 | Hazelton et al. | |
| 6,374,746 | B1 | 4/2002 | Fiske | |
| 6,418,857 | B1 | 7/2002 | Okano et al. | |
| 6,502,517 | B1 | 1/2003 | Groening et al. | |
| 6,684,794 | B2 | 2/2004 | Fiske et al. | |
| 7,114,882 | B1 * | 10/2006 | Friedmann | E02D 27/50 405/194 |
| 7,835,830 | B2 | 11/2010 | Ellmann et al. | |
| 7,841,564 | B2 | 11/2010 | Ellmann et al. | |
| 8,006,625 | B2 | 8/2011 | Yang | |
| 8,214,957 | B2 | 7/2012 | Miettinen | |
| 8,250,990 | B2 | 8/2012 | Kunz | |
| 8,281,723 | B2 | 10/2012 | Loeser et al. | |
| 8,297,195 | B2 | 10/2012 | Loser et al. | |
| 8,468,949 | B2 | 6/2013 | Kwon et al. | |
| 8,500,373 | B1 | 8/2013 | Epps | |
| 8,534,197 | B2 | 9/2013 | Miller | |
| 8,734,139 | B2 | 5/2014 | Burns et al. | |
| 8,915,192 | B2 | 12/2014 | Zhou | |
| 9,085,304 | B2 | 7/2015 | Oster | |
| 9,228,298 | B2 | 1/2016 | Oster | |
| 9,290,187 | B2 | 3/2016 | Dalrymple | |
| 9,302,577 | B2 | 4/2016 | Catalan | |
| 2001/0037747 | A1 | 11/2001 | Svensson | |
| 2002/0197135 | A1 | 12/2002 | Arntzen et al. | |
| 2004/0056538 | A1 | 3/2004 | Du et al. | |
| 2004/0139723 | A1 | 7/2004 | Parkin | |
| 2004/0144096 | A1 | 7/2004 | Wollenweber | |
| 2004/0155031 | A1 | 8/2004 | Toyooka et al. | |
| 2005/0076802 | A1 | 4/2005 | Pullium | |
| 2006/0032063 | A1 | 2/2006 | Tomasello et al. | |
| 2006/0091347 | A1 * | 5/2006 | McGuire | F16K 3/0236 251/326 |
| 2006/0150858 | A1 * | 7/2006 | Appleton | F16L 55/34 104/138.1 |
| 2006/0233616 | A1 * | 10/2006 | Friedmann | E02D 27/50 405/224 |
| 2006/0235589 | A1 | 10/2006 | Deng et al. | |
| 2007/0187556 | A1 | 8/2007 | Yoshitake | |
| 2007/0214994 | A1 * | 9/2007 | Ardente | B62D 61/06 104/138.1 |
| 2008/0275572 | A1 | 11/2008 | Tillotson | |
| 2008/0277534 | A1 | 11/2008 | Ellmann et al. | |
| 2009/0101040 | A1 * | 4/2009 | Yang | B61B 13/10 104/138.1 |
| 2009/0158955 | A1 | 6/2009 | Pulliam | |
| 2010/0005997 | A1 | 1/2010 | Tozoni | |
| 2010/0083864 | A1 * | 4/2010 | Flynn | B61B 13/10 104/138.1 |
| 2010/0092243 | A1 | 4/2010 | Bauder | |
| 2010/0115947 | A1 | 5/2010 | Galbraith | |
| 2010/0143044 | A1 | 6/2010 | Kadaster et al. | |
| 2010/0183407 | A1 | 7/2010 | Kim | |
| 2010/0192799 | A1 * | 8/2010 | Miller | B60L 13/04 104/138.1 |
| 2011/0042592 | A1 * | 2/2011 | Elliott | F16K 47/08 251/120 |
| 2011/0226151 | A1 * | 9/2011 | Pumpelly | B60L 11/00 104/118 |
| 2011/0226764 | A1 | 9/2011 | Smith et al. | |
| 2011/0283914 | A1 * | 11/2011 | Kwon | B61B 13/08 104/138.1 |
| 2012/0089525 | A1 | 4/2012 | Kley et al. | |
| 2012/0153744 | A1 | 6/2012 | Criswell et al. | |
| 2012/0285575 | A1 | 11/2012 | Catha | |
| 2012/0299684 | A1 | 11/2012 | Won | |
| 2013/0025493 | A1 * | 1/2013 | Friedmann | B60L 13/04 104/138.1 |
| 2013/0125779 | A1 * | 5/2013 | De Matias Jimenez | B61B 13/10 104/138.1 |
| 2013/0136546 | A1 * | 5/2013 | Friedmann | B60L 13/04 406/181 |
| 2013/0276665 | A1 | 10/2013 | Dalrymple | |
| 2014/0000473 | A1 | 1/2014 | Miller | |
| 2014/0261054 | A1 * | 9/2014 | Oster | E01B 25/34 104/130.02 |
| 2014/0261055 | A1 | 9/2014 | Oster | |
| 2014/0354064 | A1 | 12/2014 | Tseliakhovich | |
| 2017/0146136 | A1 * | 5/2017 | Cothern | F16K 3/30 |

(56) References Cited

U.S. PATENT DOCUMENTS

FOREIGN PATENT DOCUMENTS

| WO | WO2003003389 A1 | 1/2003 |
|---|---|---|
| WO | WO2007087028 A2 | 8/2007 |
| WO | WO2009/135389 | 11/2009 |

OTHER PUBLICATIONS

Wright, I., "Engineering the Hyperloop: Testing 4 Core Elements," dated Feb. 16, 2016.
Protalinski, E., "Hyperloop's intro video claims the future is now," dated Sep. 17, 2015.
GNB Product Catalog.
Khatait, J., et al., "Design and development of orifice-type aerostatic thrust bearing," SIMTech technical reports, vol. 6, No. 1 (Jan. 2005).
Barsikow, B., et al., "Noise Characteristics of the Transrapid TR08 Maglev System," US Department of Transportation, 338 pages (Jul. 2002).
Brecher, A., et al., "Electromagnetic Field Characteristics of the Transrapid TR08 Maglev System," US Department of Transportation, 224 pages (May 2002).
Chan, L., et al., "Vibration Characteristics of the Transrapid TR08 Maglev System," US Department of Transportation, 143 pages (Mar. 2002).
Todorovich et al., "High-Speed Rail—International Lessons for U.S. Policy Makers," Lincoln Institute of Land Policy, 64 pages (2011).
Peterman, D., et al., "The Development of High Speed Rail in the United States: Issues and Recent Events," Congressional Research Service, 35 pages (Dec. 20, 2013).
International Search Report and Written Opinion of International Searching Authority for related Application No. PCT/US2016/015231, dated Mar. 25, 2016.
International Search Report and Written Opinion of International Searching Authority for related Application No. PCT/US16/15228, dated Apr. 8, 2016.
International Search Report and Written Opinion of International Searching Authority for related Application No. PCT/US16/15215, dated Apr. 8, 2016.
International Search Report and Written Opinion of International Searching Authority for related Application No. PCT/US2016/015234, dated Apr. 4, 2016.
Barboza, D., "A New Port in Shanghai, 20 Miles Out to Sea," The New York Times, Dec. 12, 2005.
International Search Report and Written Opinion of International Searching Authority for related Application No. PCT/US2016/015221, dated Mar. 31, 2016.
International Search Report and Written Opinion of International Searching Authority for related Application No. PCT/US2016/015224, dated Apr. 11, 2016.
International Search Report and Written Opinion of International Searching Authority for related Application No. PCT/US2016/015229, dated Apr. 4, 2016.
Thornton. R., "The Future of Maglev," Magnemotion, Nov. 5, 2007.
International Search Report and Written Opinion of International Searching Authority for related Application No. PCT/US2016/015206, dated Apr. 1, 2016.
International Search Report and Written Opinion of International Searching Authority for related Application No. PCT/US2016/015236, dated Mar. 29, 2016.
International Search Report and Written Opinion of International Searching Authority for related Application No. PCT/US2016/015238, dated Apr. 1, 2016.
International Search Report and Written Opinion of International Searching Authority for related Application No. PCT/US2016/015239, dated Mar. 30, 2016.
International Preliminary Report on Patentability for related Application No. PCT/US2016/015239, dated Aug. 8, 2017.

* cited by examiner

GATE VALVES AND AIRLOCKS FOR A TRANSPORTATION SYSTEM

CROSS REFERENCE TO RELATED APPLICATIONS

The present application is a continuation application of U.S. application Ser. No. 15/007,712, filed on Jan. 27, 2016, which claims the benefit of U.S. Provisional Application No. 62/113,511 filed on Feb. 8, 2015, U.S. Provisional Application No. 62/232,876 filed on Sep. 25, 2015, and U.S. Provisional Application No. 62/242,562 filed on Oct. 16, 2015, the disclosures of which are expressly incorporated by reference herein in their entireties.

FIELD OF THE DISCLOSURE

The present disclosure relates to gate valves and air lock systems (e.g., using gate valves) for a high-speed transportation system, and methods of use thereof.

BACKGROUND OF THE DISCLOSURE

A high speed, high efficiency transportation system utilizes a low-pressure environment in order to reduce drag on a vehicle at high operating speeds, thus providing the dual benefit of allowing greater speed potential and lowering the energy costs associated with overcoming drag forces. In embodiments, these systems may use a near vacuum (e.g., low-pressure) environment within a tubular structure. The entire span of the tube, which is potentially hundreds of miles, is maintained at a low pressure, and thus, air is evacuated from the tubular structure in order for the system to operate.

Specific portions of the tube may need to be regularly re-pressurized, and discrete portions of the tube may need to be capable of depressurization for access thereto (e.g., for routine maintenance and/or emergency procedures). As the current state of the art does not encompass partially evacuated large diameter tubes for transportation, substantial thought has not be given to creating airlocks in such an environment. Thus, there exists a need in the art for improved gate valves and/or air locks for a high-speed transportation system.

SUMMARY OF THE EMBODIMENTS OF THE DISCLOSURE

At least some embodiments of the present disclosure are directed to a gate valve operable to isolate sections of an externally pressurized, evacuated, or near vacuum tubular structure. In accordance with aspects of the disclosure, the valve, when open, will also accommodate a passing vehicle within the diameter of the tube.

Aspects of the present disclosure are directed to a system comprising at least one tube forming a portion of a transportation path, wherein the tube is maintained as a low-pressure environment, a propulsion system configured to propel at least one capsule through the tube, a levitation system configured to levitate the capsule within the tube, and at least one tube sealer arranged along the at least one tube and configured to selectively create an airlock in the at least one tube.

In certain embodiments, the at least one tube sealer comprises a gate valve having a gate that is moveable into the transportation path to create the airlock in the at least one tube.

In embodiments, the gate valve additionally comprises a gate housing configured to accommodate the gate.

In additional embodiments, the gate housing includes reinforcement structures to increase a strength and/or stiffness of the gate housing.

In some embodiments, the gate valve additionally comprises at least one gate actuator configured to selectively move the gate at least one of into and out of the transportation path.

In further embodiments, at least one gate actuator comprises at least two gate actuators, wherein one gate actuator is configured to move the gate in a direction perpendicular to a direction of the transportation path, and wherein a second gate actuator is configured to move the gate in a direction parallel to the direction of the transportation path.

In certain embodiments, the gate valve additionally comprises at least one flange configured for attachment to the at least one tube.

In other embodiments, the gate valve additionally comprises at least one gate guide within which the gate in operable to move into the transportation path to create the airlock in the at least one tube.

In additional embodiments, the gate valve is linearly actuated into an operative position to create the airlock in the at least one tube.

In some embodiments, the gate valve is rotationally actuated into an operative position to create the airlock in the at least one tube.

In further embodiments, the gate valve comprises a wedge-shaped gate.

In certain embodiments, the gate includes a track-gap support surface that is structured and arranged to reduce a size of a gap in the transportation path when the gate is maintained in a gate storage area.

In embodiments, the gate valve includes a bridging element that is structured and arranged to reduce a size of a gap formed between adjacent tubes.

In additional embodiments, the system further comprises actuator configured for moving the bridging element from a recessed position to a position within the gap.

In some embodiments, the at least one tube sealer comprises a hyperbolic paraboloid-shaped sealing element that is positionable in the transportation path to create the airlock in the at least one tube.

In further embodiments, the at least one tube sealer comprises an airbag that is inflatable in the transportation path to create the airlock in the at least one tube.

In certain embodiments, the airbag is attached to the tube.

In embodiments, the airbag comprises at least one sealing aid.

In additional embodiments, the airbag is a capsule-based airbag comprising an airbag arranged on each longitudinal end of a capsule traversing the at least one tube.

In some embodiments, the gate valve is linearly actuated in one direction into an operative position to create the airlock in the at least one tube.

In further embodiments, the gate valve is linearly actuated in two discrete directions into an operative position to create the airlock in the at least one tube.

In certain embodiments, the gate valve comprises an iris-type aperture.

Further aspects of the present disclosure are directed to a tube sealer configured for creating an airlock in a tube system comprising at least one transportation tube having at least one track along a transportation path; a propulsion system adapted to propel at least one capsule through the tube; and a levitation system adapted to levitate the at least one capsule within the tube. The tube sealer comprises at least one of a gate valve having a gate that is moveable into the transportation path to create the airlock in the at least one tube; and an airbag that is inflatable in the transportation path to create the airlock in the at least one tube.

Yet further aspects of the present disclosure are directed to a system comprising at least one transportation tube having at least one track along a transportation path, a propulsion system adapted to propel at least one capsule through the tube, a levitation system adapted to levitate the capsule within the tube, and at least one tube sealer arranged along the at least one tube and configured to selectively control pressure between two tube sections. The at least one transportation tube is maintained as a low-pressure environment.

BRIEF DESCRIPTION OF THE DRAWINGS

The novel features which are characteristic of the systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the system. For a more complete understanding of the disclosure, as well as other aims and further features thereof, reference may be had to the following detailed description of the disclosure in conjunction with the following exemplary and non-limiting drawings wherein.

DETAILED DISCLOSURE

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions (unless otherwise explicitly indicated).

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

The various embodiments disclosed herein can be used separately and in various combinations unless specifically stated to the contrary.

Figure 1:
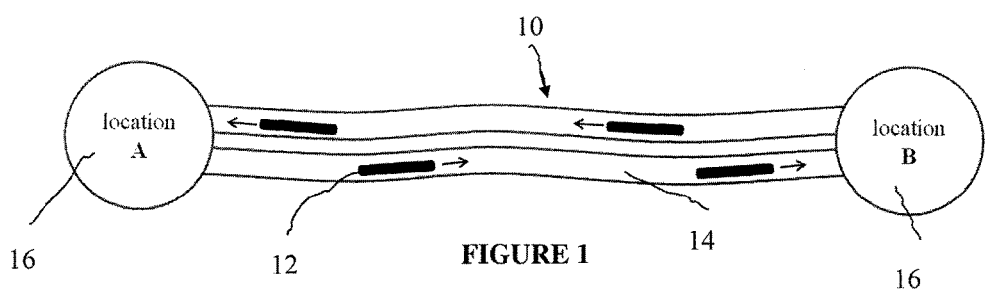
FIG. 1 is a schematic view of the transportation system in accordance with embodiments of the present disclosure.

Referring to FIG. 1, a transportation system 10 in accordance with aspects of the present disclosure is illustrated. In embodiments, the transportation system 10 comprises one or more capsules or transport pods 12 traveling through an enclosure; in one non-limiting embodiment described herein, the enclosure comprises at least one tube 14 (which can comprise a single tube or a plurality of connected tube segments) between two or more stations 16. In one exemplary embodiment of the present disclosure, the one or more capsules 12 of the transportation system 10 move through a low-pressure environment within the at least one tube 14. In accordance with certain aspects of the disclosure, a low-pressure environment includes (but is not limited to) any pressure that is below 1 atmosphere (or approximately 1 bar) at sea level.

Some elements of a high-speed transportation system are discussed in related and commonly-assigned application Ser. No. 15/007,783, entitled "Transportation System," filed on even date herewith, the entire contents of which are expressly incorporated by reference herein in its entirety.

In embodiments of the present disclosure, a system comprises one or more partially evacuated cylindrical tubes 14 that connect the stations 16 in a closed loop system. In embodiments, tubes 14 may be sized for optimal air flow around the capsule 12 to improve performance and energy consumption efficiency at the expected or design travel speed. In accordance with aspects of the disclosure, the low-pressure environment in the tubes 14 minimizes the drag force on the capsule 12, while maintaining the relative ease of pumping out the air from the tubes.

Figure 2:
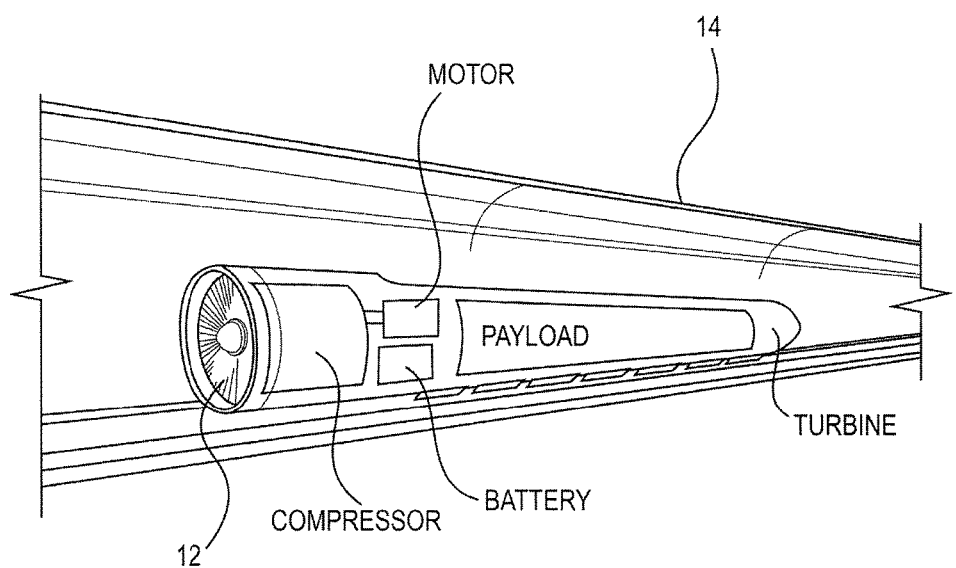
FIG. 2 illustrates a view of an exemplary capsule for use in the transportation system in accordance with embodiments of the present disclosure.

Referring now to FIG. 2, an exemplary and non-limiting depiction of a capsule or transport pod 12 of the transportation system is illustrated. In embodiments, the capsule 12 may be streamlined to reduce an air drag coefficient as the capsule 12 travels through the low-pressure environment of the at least one tube 14 of the transportation system. In accordance with aspects of the disclosure, in certain embodiments, a compressor arranged at the front end of the capsule is operable to ingest at least a portion of the incoming air and pass it through the capsule (instead of displacing the air around the vehicle). For example, as schematically shown in the exemplary embodiment of FIG. 2, the capsule 12 may include a compressor at its leading face. In embodiments, the compressor is operable to ingest oncoming air and utilize the compressed air for the levitation process (when, for example, the capsules are supported via air bearings that operate using a compressed air reservoir and aerodynamic lift). Additionally, as schematically shown in the exemplary embodiment of FIG. 2, in certain embodiments, the compressed air may be used to spin a turbine, for example, located at the rear end of the capsule, to provide power to the capsule 12. As schematically shown in the exemplary embodiment of FIG. 2, the capsule 12 may also include a motor structured and arranged to drive the compressor, and a battery for storing energy, e.g., derived from the turbine. The capsule 12 also includes a payload area, which may be configured for humans, for cargo, and/or for both humans and cargo.

In accordance with aspects of the disclosure, specific portions of the tube may need to be regularly re-pressurized to allow for ingress and egress of the vehicle without depressurizing the entire system. For example, for a loading process at the transportation system stations, the human passengers are loaded into the capsule in an ambient (e.g., 1 atm.) atmosphere, and the capsule is sealed in an air tight manner. The sealed capsule is then loaded through an opening into a tube for insertion into the low-pressure tube environment. As the station is at atmospheric pressure, and the interior of the tube transportation system is maintained at a pressure lower than atmospheric pressure, in accordance with aspects of the disclosure, the transportation system may include a plurality of gate valves arranged on and/or along the tube to provide an airlock so that when the capsule is loaded into the transportation tube (or, e.g., an emergency worker enters the tube), the low-pressure environment within the tube is not lost.

In contemplated embodiments, the gate valves may be arranged along a transportation route, spaced, e.g., every few kilometers. The gate valves may be arranged on the tube at a point where the tube is supported by at least one support (e.g., a pillar) so as to utilize the support strength of the support to additionally carry the gate valve. In some embodiments, a gate valve may be arranged on a portion of unsupported tube (e.g., between supports or pillars).

Additionally, for example, discrete portions of the tube may need to be capable of depressurization for routine maintenance and/or emergency procedures. Completely pressurizing and depressurizing the entire tube for every one of these operations would cause massive delays in usage, as well as represent a significant source of energy, cost, and time consumption.

Conventional airlocks and their accompanying mechanisms can be large and/or unwieldy and/or expensive to implement, for example, over large scales. Additionally, conventional airlocks, for example, as used in high-pressure environments, are expensive and may be over-designed in order to counter high-pressure forces experienced in such environments.

Figure 3:
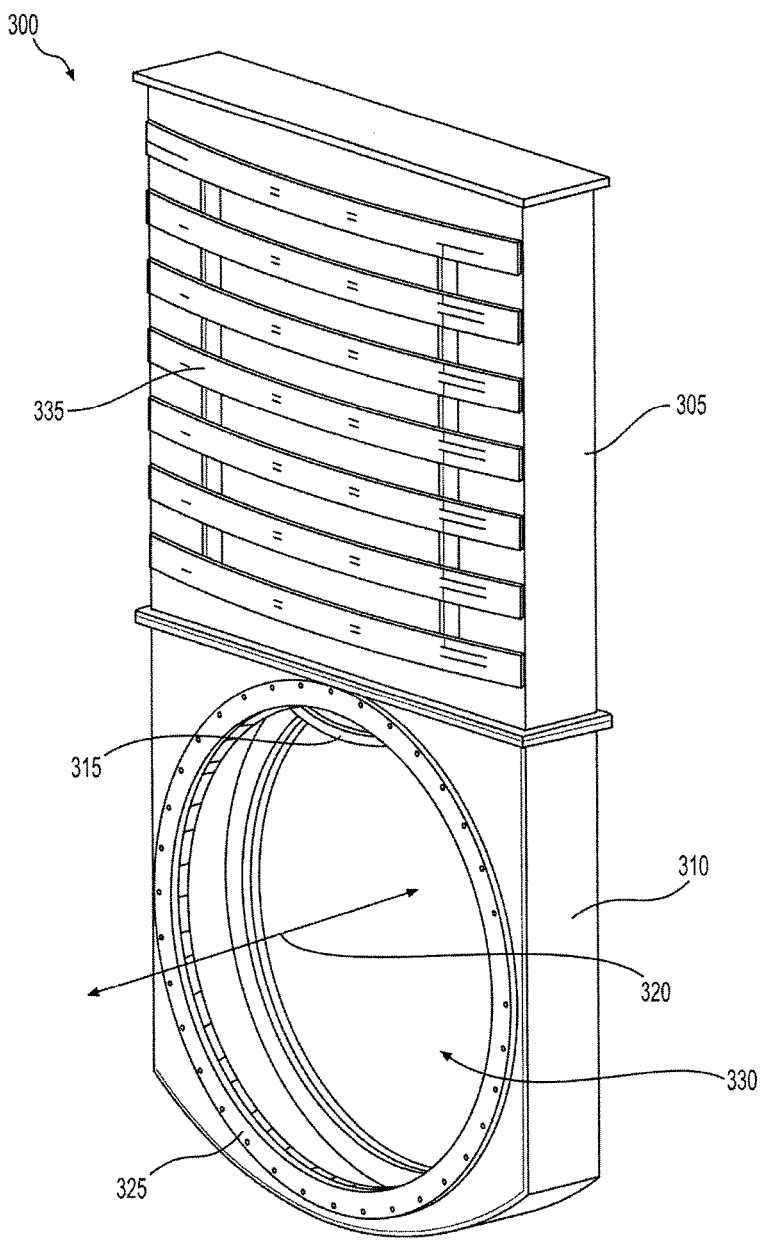
FIG. 3 illustrates a perspective view of an exemplary gate valve in accordance with embodiments of the present disclosure.

FIG. 3 illustrates a perspective view of an exemplary gate valve 300 in accordance with embodiments of the present disclosure, which may be used to control pressures between tube sections (e.g., create an airlock). With this exemplary embodiment, a valve door (or gate) may use an actuator to slide radially. As shown in FIG. 3, the gate valve 300 includes an upper housing 305 and a lower housing 310. The lower housing 310 has a passageway 330 therethrough for a capsule (not shown) to traverse in the directions 320. When the gate valve 300 is open, the gate 315 is maintained in the upper housing 305. When desired or required, the gate valve 300 can be closed by lowering the gate 315 from its recessed position in the upper housing 305 (and, in embodiments, actuating the gate in one of direction 320) to seal off the passageway 330. As the gate 315 reaches the bottom of its actuation, a guide structure forces the door to seal against a sealing surface that is substantially coaxial with the tube. As noted above, in embodiments, movement of the gate 315 may include a downward movement to arrange the gate in the passageway 330, followed by a lateral movement in one of directions 320 to create a seal between the gate 315 and interior of the lower housing 310. The sealing surface can be substantially flat, which requires less seal maintenance. In embodiments, the gate 315 (or valve door) can be made out of a number of hardened substances, such as steel or rubber.

As shown in FIG. 3, the lower housing 310 also includes reinforcement rings (or flanges) 325 around the periphery of the passageway 330, which provide reinforcement to the lower housing 310, and provide an attachment surface for securing the tubes (not shown) to the gate valve 300. The reinforcement rings (or flanges) 325 on either side of the lower housing 310 facilitate ease of attachment to the tubular structure (not shown), as the reinforcement rings (or flanges) 325 are configured to bolt to a mating flange attached to the tube.

While the exemplary embodiment of FIG. 3 includes "upper" and "lower" housings, these terms should not be construed to limit the disclosure. That is, the disclosure contemplates that the gate valve 300 may be oriented any number of ways other than with an "upper" gate storing area (e.g., with the gate storing area off to one side or below the tube).

As additionally shown in FIG. 3, in embodiments, the upper housing 305 includes reinforcement members 335, which are structured and arranged to provide additional strength to the gate valve 300. As should be understood, the interior of the gate valve 300 will be at the same low pressure as the tube interior. As such, reinforcement members 335 are utilized to increase the strength of the housing of the gate valve, so as to reduce deformation and/or damage caused by the pressure differential between the inside and the outside of the gate valve 300.

Figure 4:
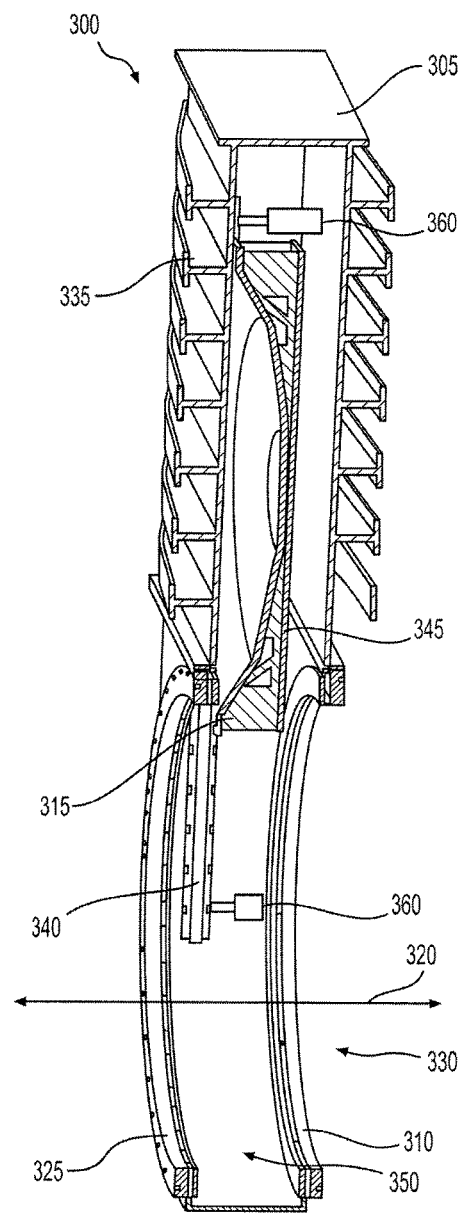
FIG. 4 illustrates a sectional view of an exemplary gate valve in accordance with embodiments of the present disclosure.

FIG. 4 illustrates a sectional perspective view of the exemplary gate valve 300 shown in FIG. 3 in accordance with embodiments of the present disclosure. As shown in FIG. 4, the gate 315 is currently positioned in the upper housing 305. The gate valve 300 also includes at least one guiding track 340 on a side of the gate valve (e.g., two guiding tracks, one on each side). The guiding tracks 340 serve to assist in guiding the gate in a downward (and upward direction) when the gate is moved. Additionally, the at least one guiding track 340 may also assist in resisting the forces (e.g., air pressures) applied to the gate when in a closed position.

As noted above, in embodiments, the gate may also undergo a lateral movement when closing. As schematically depicted, in embodiments, one or more lateral actuators 360 may be attached to the guiding track(s) 340 to actuate the guiding tracks 340 (and the gate 315 situated in the guiding tracks 340) in a lateral direction (i.e., along one of directions 320) so that the gate 315 is effectively sealed against an interior side of one of the reinforcement rings 325. In embodiments, the lateral actuator 360 may comprise a motor, an electromechanical actuator, a mechanical linkage, a hydraulic cylinder, and/or pneumatic cylinder.

As the gate 315 is used to provide an air lock, the gate 315 may be expected to endure high pressures (or high pressure differentials). The gate 315 includes a gate reinforcement member 345 secured to the gate 315, which is structured and arranged to strengthen the gate 315. As such, in embodiments, the gate reinforcement member 345 may comprise an I-beam or truss structure, with other support configurations contemplated. As shown in FIG. 4, reinforcement members 335 can be provided on the upper housing 305 and may comprise, e.g., I- and/or T-beam structures utilized to increase the strength of the housing of the gate valve 300, so as to reduce deformation and/or damage caused by the pressure differential between the inside and the outside of the gate valve 300.

In embodiments, the gate 315 may be moved from the open position to the closed position (and/or vice versa) using an actuator. For example, in embodiments, the gate valve 300 may include a motor (e.g., a servo motor, linear motor), an electromechanical actuator, a mechanical linkage, a hydraulic cylinder, and/or pneumatic cylinder, configured to actuate the gate 315 both from open to closed positions, and from closed to open positions. The gate valve 300 may include one or more sensors (e.g., optical sensors) operable to detect the current position of the gate 315.

In further contemplated embodiments the gate valve may utilize gravitational forces to either open or close the gate. For example, with the exemplary embodiment of FIG. 3, the gate valve 300 may include a releasable latch (not shown) configured to maintain the gate 315 in the upper housing. Upon actuating the releasable latch, the gate 315 may fall into position (at least vertically) utilizing gravitational forces. With such a gravitationally-deployed gate, the gate valve 300 may include an actuator (e.g., a motor and/or hydraulic or pneumatic actuator) to move the gate 315 back to the open position. In other embodiments, at least one counter-balance may be used to assist in moving the gate 315 (e.g., either in a deployment direction or gate opening direction).

As shown in FIG. 4, the gate 315 may have a convex/concave shape. In accordance with aspects of the disclosure, this convex/concave shape of the gate 315 assists in achieving a seal of the gate 315 against an interior of the lower housing 310.

As shown in FIG. 4, when the gate 315 is in the open position, in embodiments, there may be a gap 350 (e.g., through the thickness of the gate valve 300) in which there is no support (e.g., tracks) for the capsule to ride upon. That is, in order for the gate 315 to be moveable into position, in embodiments, a gap 350 may be provided in the gate valve 300. In such embodiments, as discussed herein, an actuatable gap support (not shown) may be included to provide a support surface for the capsule to ride upon as it traverses the gate valve 300. For example, a bridge piece may be moved into place to allow the vehicle to bypass the gate valve 300.

In embodiments, the gate valve may be designed to handle atmospheric pressure against vacuum (as opposed to high-pressure valves, for example). In accordance with aspects of the disclosure, this allows the gate itself, along with the gate support structure and actuator to be relatively lightweight. That is, because the vacuum produced in this system is much lower than conventional valves are designed for, the gate valve is designed for lower vacuum tolerances expected in the high-speed transportation system. The benefits of a lighter gate structure include quicker operating times and lighter, more easily maneuverable doors.

Figure 5:
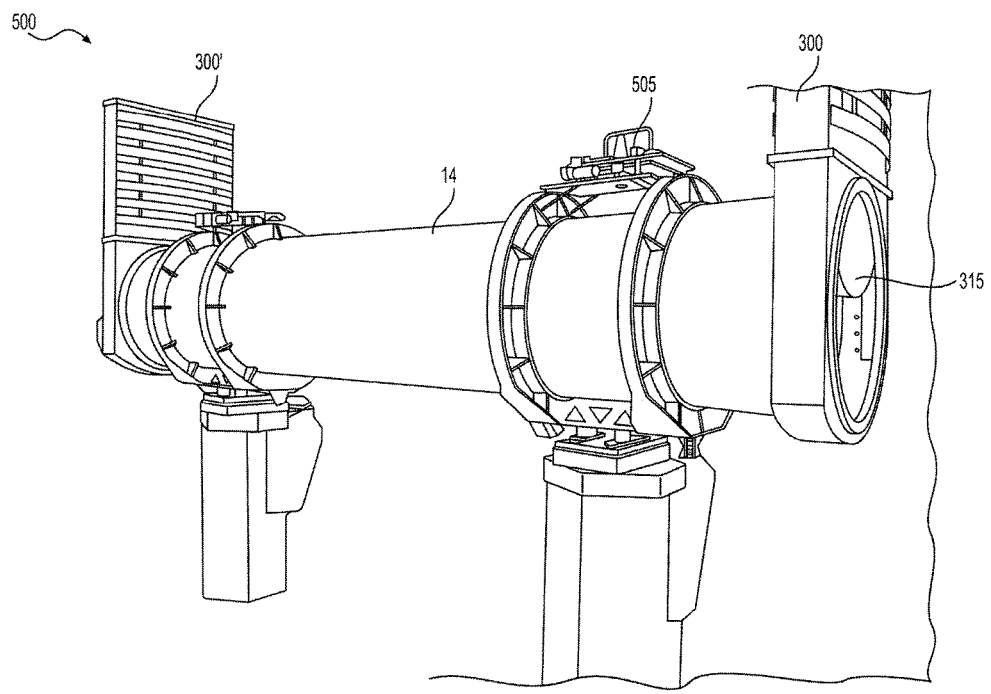
FIG. 5 illustrates a perspective view of exemplary gate valves attached to a transportation tube in accordance with embodiments of the present disclosure.

FIG. 5 illustrates a perspective view of exemplary gate valves 300, 300' attached to a transportation tube 14 in accordance with embodiments of the present disclosure. Such an arrangement of a transportation tube 14 with gate valves 300 attached to each end might be utilized for example, as an air lock at the entrance and/or exit of the low-pressure transportation system. For example, as discussed above, with gate valve 300' already closed, a capsule (not shown) may be loaded into the tube 14 through the gate valve 300, and the gate 315 closed and sealed. The pressure is then lowered in the tube using pumps 505 so that the pressure in the tube equals the pressure in the low-pressure environment of the transportation system. The gate valve 300' can then be opened (while gate valve 300 remains closed), and the capsule can be moved out of the tube 14 and into the transportation system.

Figures 6A, 6B:
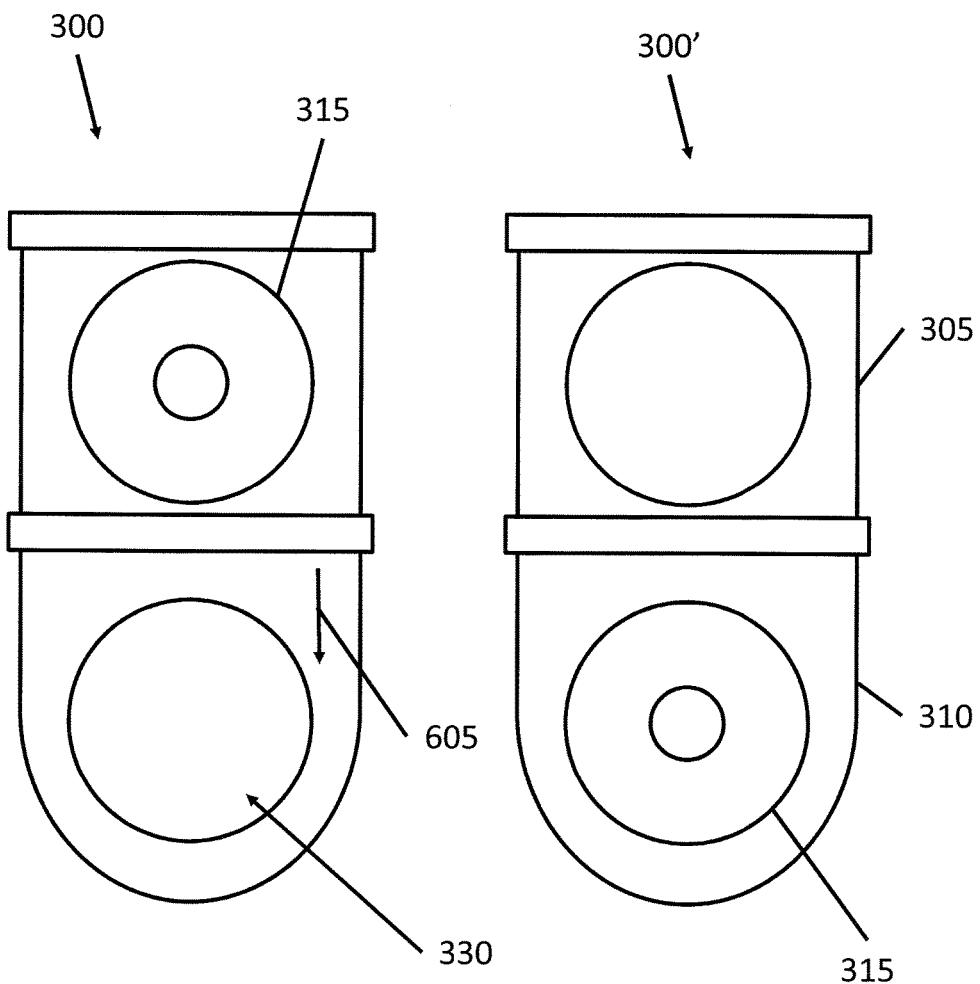
FIGS. 6A-6C are exemplary schematic depictions of an exemplary gate valve in accordance with embodiments of the present disclosure.
Figure 6C:
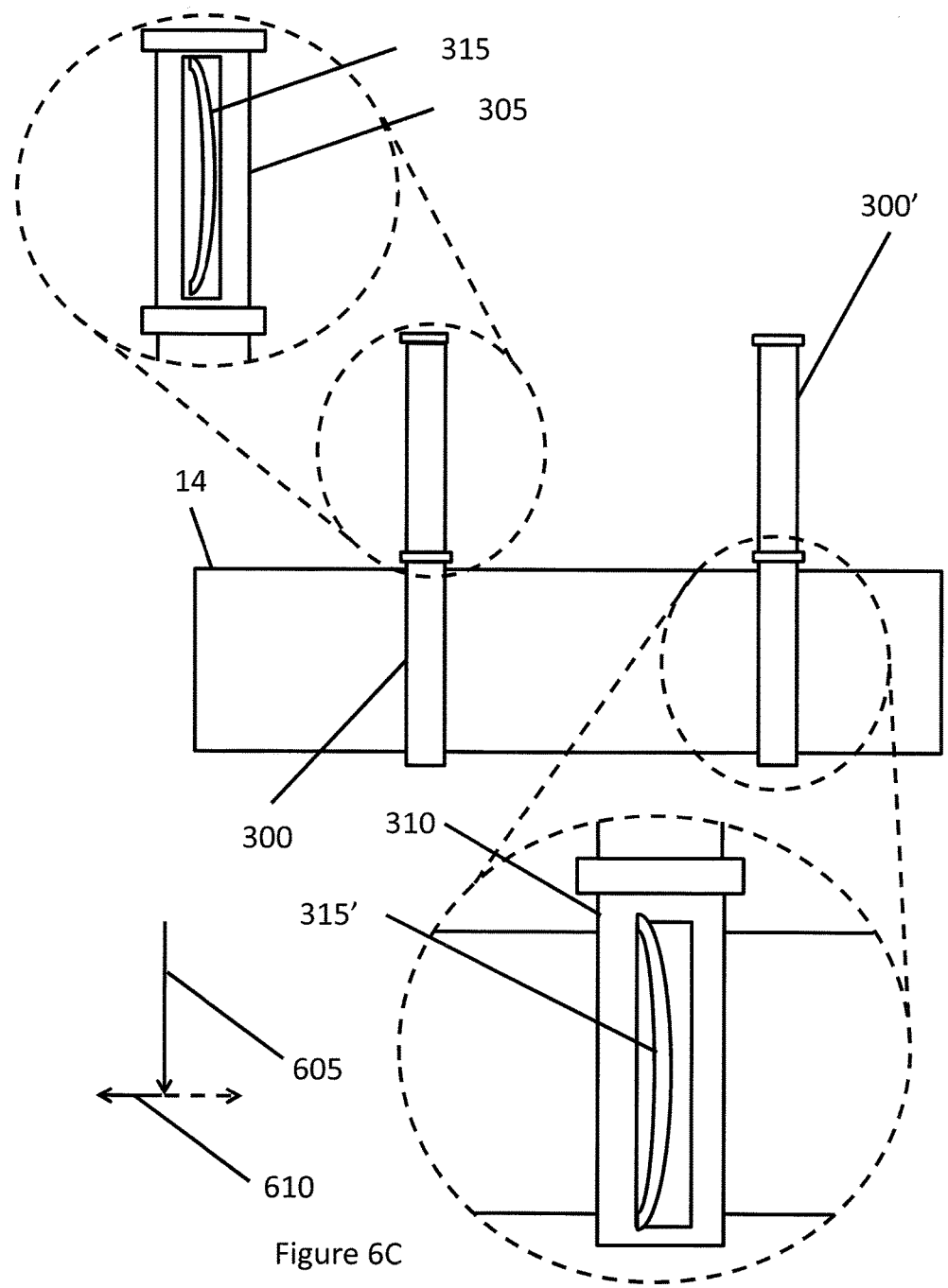

FIGS. 6A-6C are exemplary schematic depictions of an exemplary gate valve 300 in accordance with embodiments of the present disclosure. As shown in FIG. 6A, the gate valve 300 is open, wherein the gate 315 is arranged in the upper housing 305 such that passageway 330 is unobstructed. Upon actuation (e.g., releasing a latch or through suitable motor or actuator and controls), the gate 315 is operable to move in direction 605 so as to be positioned as shown with gate valve 300' in FIG. 6B. As illustrated in FIG.

6B, the gate 315 is now positioned to cover passageway 330, thus providing a seal. As noted above, in embodiments, the gate 315 may also be actuated in a capsule-passing direction (e.g., into and/or out of the page as depicted in FIGS. 6A and 6B) to effectuate a seal between the gate 315 and an interior surface of the lower housing 310.

FIG. 6C illustrates an exemplary schematic partial sectional view of exemplary gate valves attached to a transportation tube 14 in accordance with embodiments of the present disclosure. More specifically, FIG. 6C schematically depicts two gate valves 300, 300' connected to a tube 14, in which gate valve 300 is in the open position and gate valve 300' is in the closed position. As depicted in the close-up of gate valve 300, in which the gate 315 is arranged in the upper housing 305, the gate 315 is arranged approximately in the center (as viewed in a left-right direction) of the upper housing 305. With this exemplary embodiment, closing the gate valve 300 includes actuating the gate 315 through two movements in two directions, e.g., downward direction 605, and leftward (or rightward) direction 610. Thus, as shown in the close-up of gate valve 300', in which the gate 315 is arranged in the lower housing 310, the gate 315' has been moved in direction 605 to align the gate 315' with the passageway, and then the gate 315' has been moved in direction 610 (e.g., leftward) to effectuate a seal between the gate 315 an interior of the lower housing 310 (e.g., interior flange surface). In embodiments, the gate 315' may by moved in direction 605 by sliding downward in at least one gate guide (e.g., guiding tracks as described above with reference to FIG. 4) using a suitable actuator (e.g., motor, linear motor, mechanical linkage). Additionally, in accordance with aspects of the disclosure, the gate guides (e.g., guiding tracks) may be connected to a lateral actuator configured to move the gate guide assembly (e.g., the gate guide and the gate 315') towards and away from the interior walls of the lower housing, so as to effectuate a seal between the gate 315' and an interior walls of the lower housing.

Figure 7A:
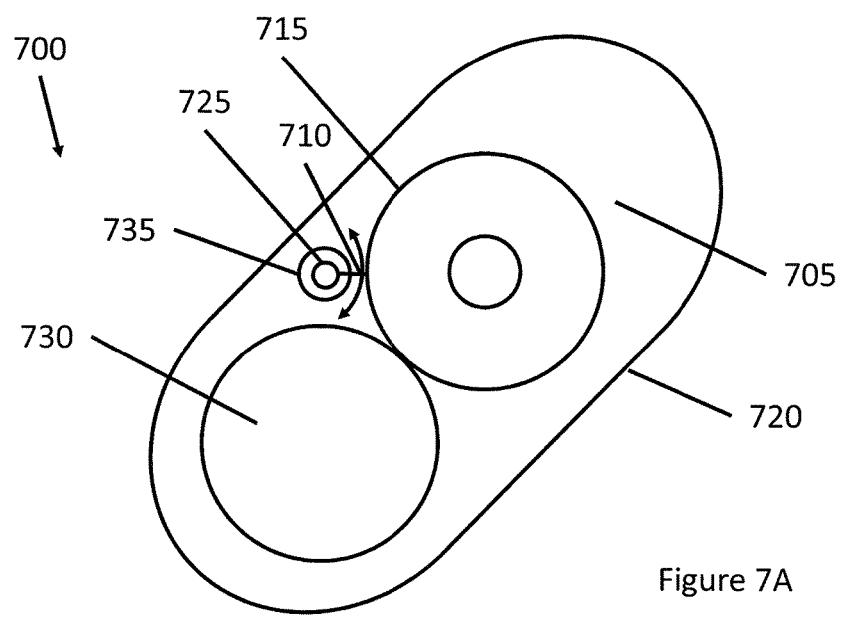
FIGS. 7A-7C are exemplary schematic depictions of an exemplary gate valve in accordance with embodiments of the present disclosure.
Figure 7B:
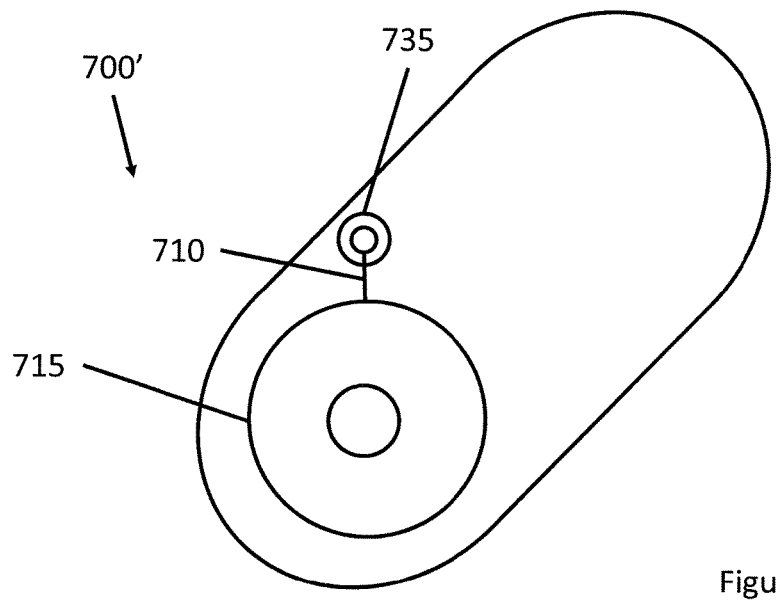
Figure 7C:
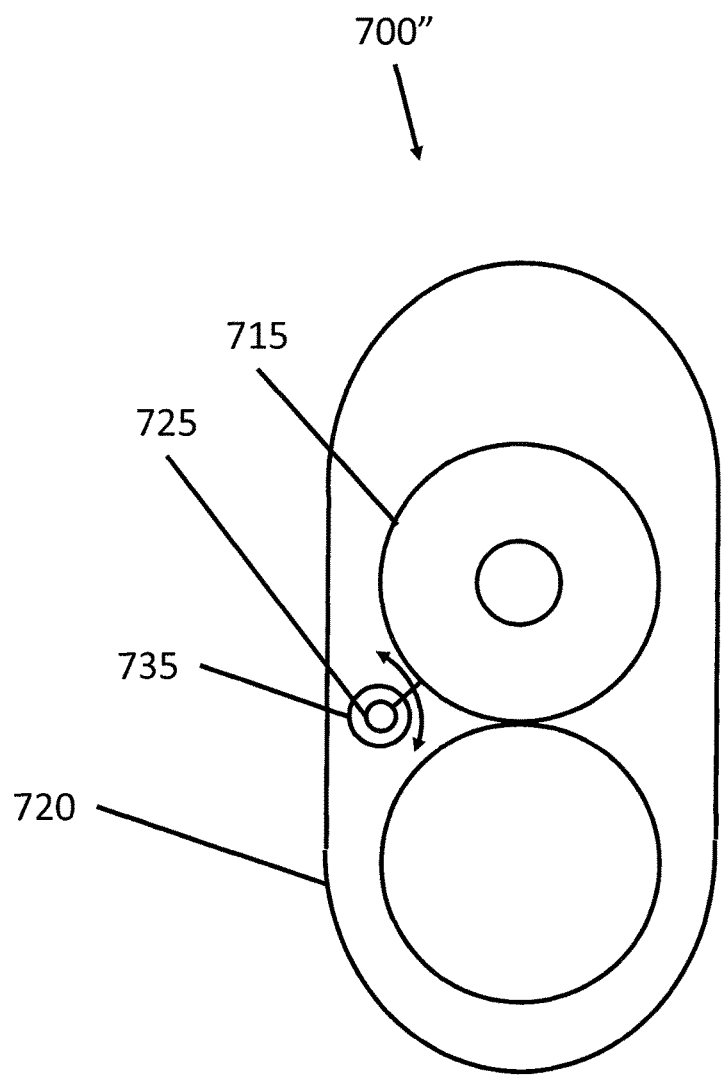

FIGS. 7A-7C are exemplary schematic depictions of an exemplary gate valve 700 in accordance with other embodiments of the present disclosure. With this embodiment, the gate 715 (or door) acts similarly to a pendulum and "swings" into its closed position. For example, as shown in FIGS. 7A and 7B, in contrast to the embodiments wherein the gate is actuated in a linear direction, (or multiple separate linear directions), with the exemplary embodiment of FIGS. 7A and 7B, the gate 715 is operable to be actuated, e.g., using an actuator 735, from the open position to the closed position (and vice versa) through a rotational movement of the gate 715 (and, in embodiments, connector 710) around pivot 725. For example, as shown in FIG. 7A, the gate valve 700 is in the open position, wherein the gate 715 is maintained in a gate storage area 705 of the gate valve housing 720, such that the capsule passageway 730 is unobstructed. In certain embodiments, the connector 710 (e.g., a connector with an adjustable length) may be utilized to connect the pivot 725 with the gate 715.

As shown in FIG. 7B, the gate valve 700' is in the closed position, wherein the gate 715 has been rotated around pivot 725 so as to seal the passageway 730. Similar to the embodiments discussed above, the gate 715 may also undergo a movement in a capsule-passing direction (e.g., into or out of the page as depicted in FIGS. 7A and 7B) to effectuate a seal between the gate 715 and an interior surface of the housing 720. In accordance with aspects of the disclosure, by utilizing a rotary (or pendulum) movement, a variety of actuators may be used. For example, in embodiments, the gate 715 may be rotationally actuated, at least in part, by a rotational motor or rotary engine, gravity, hydraulic actuators, and/or pneumatic actuators. In further contemplated embodiments, the gate may comprise an iris-type aperture (for example, similar to a camera aperture) that is operable to fully close, to control a pressure between tube sections.

While the embodiments of FIGS. 7A and 7B illustrate the gate housing 720 (i.e., the longitudinal axis of the gate housing 720) as being angularly arranged (with respect to vertical), as shown with the exemplary gate valve 700" of FIG. 7C, the gate valve 700" may be structured and arranged such that the longitudinal axis of the gate housing 720 is approximately aligned with vertical.

Figure 8A:
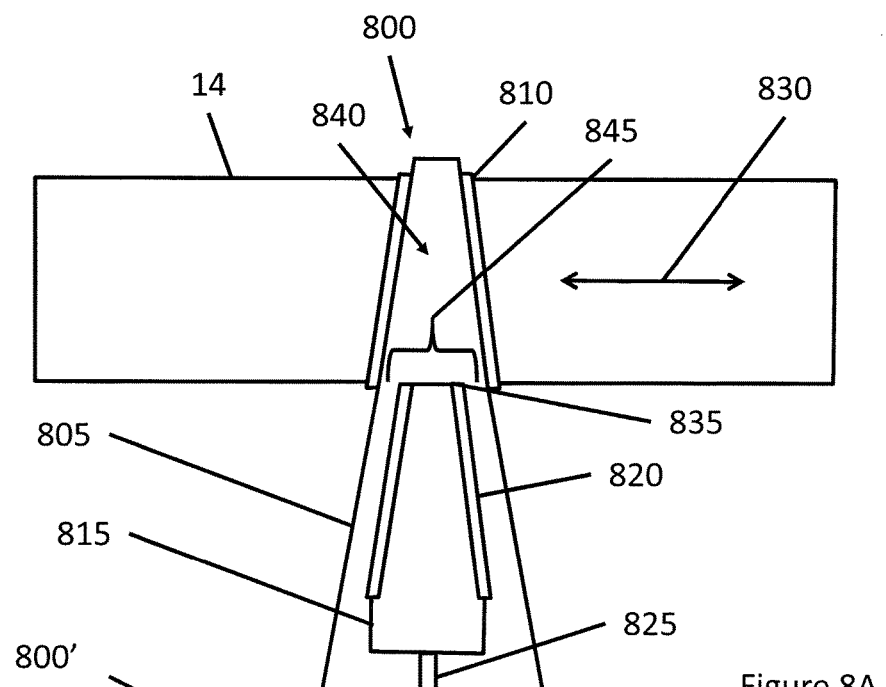
FIGS. 8A-8B are exemplary schematic depictions of an exemplary gate valve in accordance with embodiments of the present disclosure.
Figure 8B:
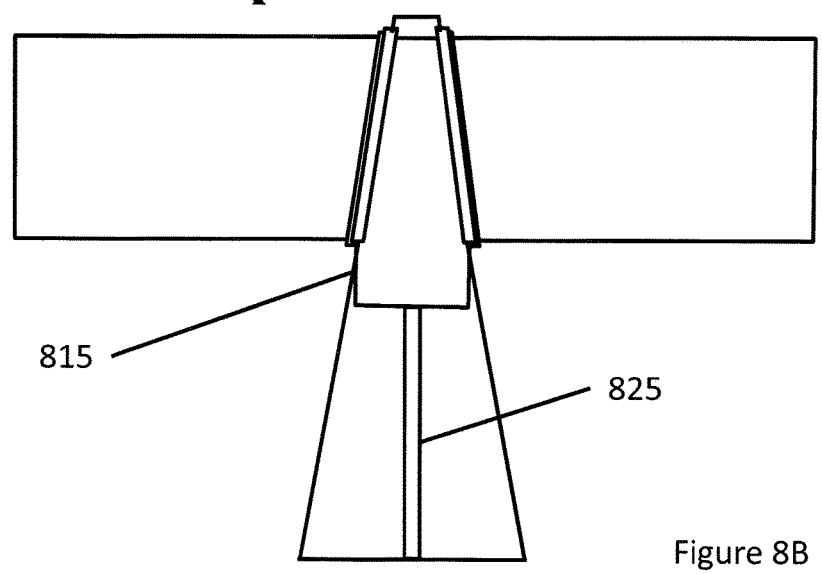

FIGS. 8A-8B are exemplary schematic depictions of an exemplary gate valve 800 in accordance with embodiments of the present disclosure. In certain embodiments, the gate acts as a wedge. For example, the gate may have an approximate triangular vertical cross-section. In accordance with aspects of the disclosure, a slanted sealing face may allow for quicker action than a relatively "flat" face (as described with the embodiments of FIG. 3). For example, with such a wedge-shaped gate, it may only be necessary to actuate in a single radial direction. In contrast, the relatively "flat" face embodiments may utilize two actuations (e.g., radial and axial) to properly orient the gate to seal the passageway. Such quicker actuation may be desirable in circumstances where speed of containment is essential, such as an emergency or leak.

As shown in FIG. 8A, an open gate valve 800 is arranged between two tubes 14 of a tube transportation system. A wedge-shaped gate 815 is recessed within gate storage area 805 beyond a capsule transportation path 830. An actuator 825 is operable to raise the gate 815 upwards to move the gate 815 into a gate-receiving area 840 such that an air seal is formed between the faces 820 of the gate 814 and the tubes 14. In embodiments, the actuator 825 may be a hydraulic or pneumatic actuator, or a motor, for example. In further embodiments, the actuator may utilize gravity to move the gate 815 (e.g., when removing the gate 815 from the gate receiving area 840).

As shown with the closed gate valve 800' of FIG. 8B, the gate 815 has been moved upwards into the gate-receiving area 840 such that an air seal is formed between the faces 820 of the gate 814 and the tubes 14. While the exemplary embodiment utilizes a gate storage area 805 arranged below the tube 14, as with other described embodiments, the disclosure contemplates other arrangements and/or orientations of the gate storage area 805 (e.g., above the tube 14 or to one or the other side of the tube). For example, when two tubes 14 are arranged in a side-by-side configuration, respective gate storage areas that are angularly offset from one another may be utilized, for example, to achieve a desired spacing of the tubes 14 relative to one another.

As shown in FIG. 8A, in some embodiments (e.g., when the gate storage area 805 is arranged beneath the tube 14), the gate 815 may include a track-gap support surface 835 configured to support a passing capsule (not shown) when the gate 815 is in the gate storage area 805. The gate 815 may be structured and arranged such that the track-gap support surface 835 is arranged in a gap 845 (e.g., the opening to the gate storage area 805) between the tubes 14. By utilizing the track-gap support surface 835, an area in the region of the gate valve 800 that may lack one or more elements of a track (e.g., elements of levitation, propulsion, and/or auxiliary tracks as otherwise may be provided in the tubes 14), is reduced. In accordance with aspects of the disclosure, by reducing this area, disturbances to the capsule passing over the gate valve 800 may be lessened, minimized, or eliminated. In certain embodiments, the track support surface 835 may include one or more elements of the levitation, propulsion, and/or auxiliary tracks, as otherwise may be provided in one or more portions of the tubes 14. For example, the track support surface 835 may include an air bearing track and/or a wheeled track surface (e.g., a rail).

Figure 9A:
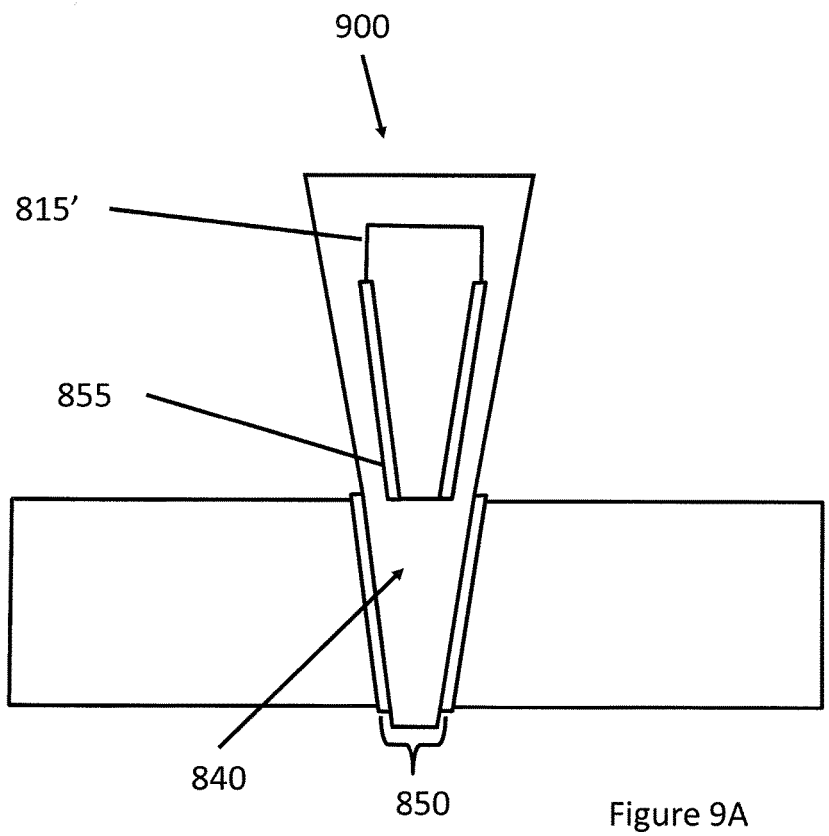
FIGS. 9A and 9B illustrate exemplary schematic partial sectional views of exemplary gate valves attached to a transportation tube in accordance with embodiments of the present disclosure.

FIG. 9A is an exemplary schematic depiction of another exemplary gate valve 900 in accordance with embodiments of the present disclosure. As shown in FIG. 9A, with an opposite orientation of the wedge-shaped gate valve 900, wherein the gate 815' is structured and arranged to "drop" from above the tube 14, a capsule will pass over a gap 850 formed by the narrower end of the gate receiving area 840. As this gap 850 is structured to accommodate a narrower end 855 of the wedge-shaped gate 815', this gap 850 is smaller than gap 845 (shown in FIG. 8A). As the gap 850 will be smaller in the orientation shown in FIG. 9A, this orientation may provide some benefits (e.g., smoother passage over gate valve) in comparison to orientations depicted in FIGS. 8A and 8B. In accordance with additional aspects of the disclosure, in embodiments, the narrower end 850 of the wedge-shaped gate 815' may be configured (e.g., sized narrowly) to minimize the size of the gap 850. That is, with this exemplary embodiment, the width of the gap 850 depends upon the approximate width of the narrower end 850 of the wedge-shaped gate 815'. By minimizing the size of the gap 850, disturbances to the capsule passing over the gate valve 900 may be lessened, minimized, or eliminated.

Figure 9B:
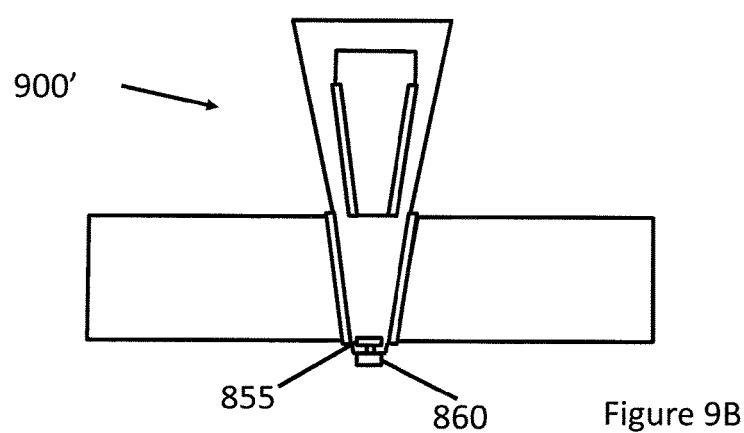

FIG. 9B is an exemplary schematic depiction of another exemplary gate valve 900' in accordance with embodiments of the present disclosure. As shown in FIG. 9B, the gate valve 900' includes an actuatable bridging element 855 configured to be raised when the gate valve 900' is open so as to provide a "bridge" for the capsule as it traverses the gap 850 (shown in FIG. 9A). The gate valve 900' may also include an actuator 860 structured and arranged to actuate the bridging element 855 (e.g., upwardly and downwardly) to move the bridging element 855 into the gap when the gate valve 900' is open, and to move the bridging element 855 out of the gap when the gate valve 900' is closed, so as not to interfere with the closing and sealing of the gate valve 900'. In certain embodiments the gate 815 and the bridging element 855 may share a common actuator (e.g., through a mechanical connection), such that when the gate 815 is moved into a closed position, the bridging element 855 is moved so as not to interfere with the closing and sealing of the gate 815.

In embodiments, the bridging element 855 may include one or more elements of the levitation, propulsion, and/or auxiliary tracks, as otherwise may be provided in one or more portions of the tubes 14. For example, the bridging element 855 may include an air bearing track and/or a wheeled track surface (e.g., a rail). In accordance with aspects of the disclosure, the bridging element allows vehicles to traverse the valve without a need for any special navigation hardware.

In other contemplated embodiments, the bridging element may be fixedly arranged in the gap, and the shape of the gate may be configured to interact with the bridging element so as to form a seal between the gate and the bridging element (as well as between the gate and the tube). For example, the gate may be configured with "cut-outs" sized to accommodate the shape of the gap so as to form a seal therewith when the gate is in the closed position. In yet further contemplated embodiments, the tracks may continue through a gate valve, and the gate may be configured (e.g., with "cut outs") to accommodate the shape of the one or more tracks so as to for a seal therewith when the gate is in the closed position.

Figure 10A:
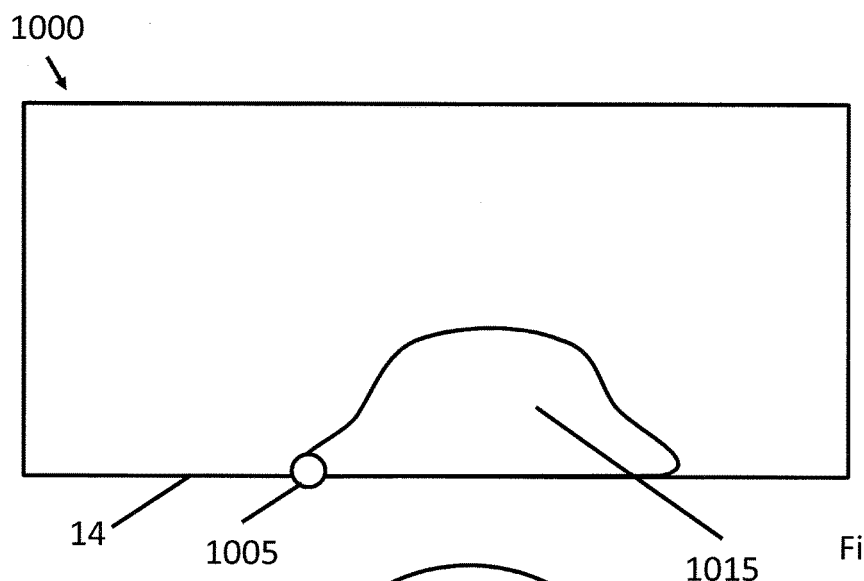
FIGS. 10A-10D are exemplary schematic depictions of an exemplary gate valve in accordance with embodiments of the present disclosure.
Figure 10B:
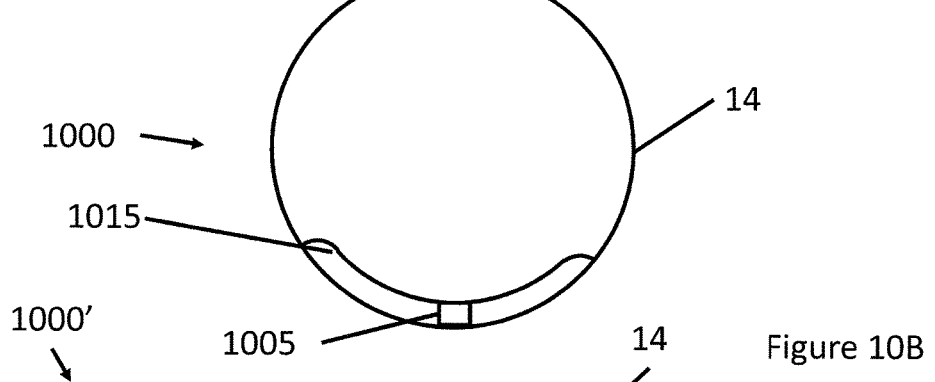

FIGS. 10A-10D are exemplary schematic depictions of aspects of an exemplary gate valve 1000 in accordance with further embodiments of the present disclosure. In embodiments, for example as schematically depicted in FIG. 10A-10D, the gate valve 1000 includes a hyperbolic paraboloid gate (or door) 1015 that is configured and structured to rotate around a pivot 1005 (e.g., an actuatable hinge or rotational joint) in direction 1020. In the open position, as schematically depicted in FIG. 10A, the gate 1015 is positioned in tube 14, along a periphery of tube 14, such that the passageway through the tube 14 is not obstructed. FIG. 10B schematically illustrates a tube-direction view with the gate 1015 in a recessed or "open" position. The disclosure also contemplates that the gate valve 1000 may also include a gate storage area (not shown) for accommodating, e.g., at least partially, a portion of the gate 1015 when in the recessed or "open" position.

Figure 10C:
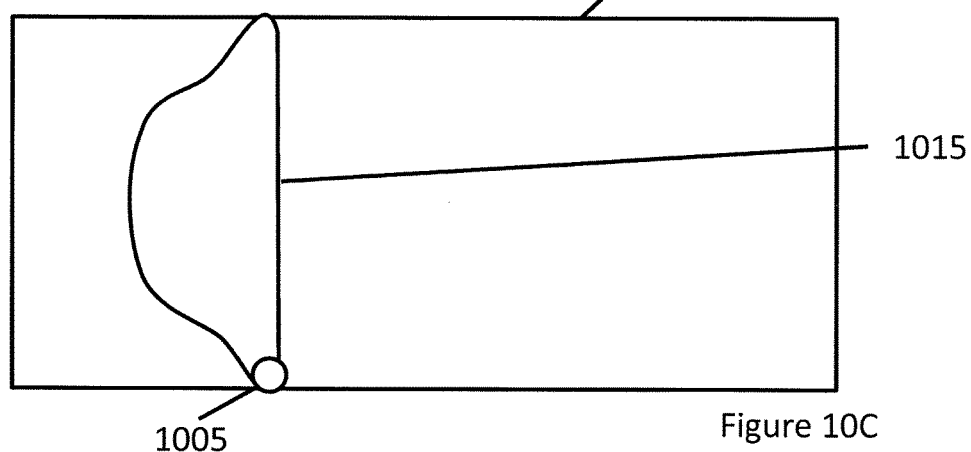

The gate 1015 is configured to have a circular-shaped door (in tube-direction view) that matches a contour of the tube's inner hull. When the gate 1015 is actuated upwardly to the closed position, as shown in FIG. 10C, the gate 1015 is structured and/or configured to create a circumferential seal with the interior of the tube 14, thus forming an airlock in the tube 14.

Since the gate 1015 (or door) has same outer contour as the inner contour of tube 14, in accordance with aspects of the disclosure, the door may have a very low profile and/or a small impact on the tube, minimizing the amount of alterations that may be necessary on the tube to implement airlocks. While the exemplary embodiments of FIGS. 10A-10C depict a gate valve 1015 that is rotated upwardly to move into the closed position, the disclosure contemplates alternative orientations, e.g., deploying from above or from the side of the tube. Additionally, in certain embodiments, more than one gate valve 1015 may be arranged (e.g., oppositely to one another in the tube) to deploy in close proximity to one another to provide a double seal.

In accordance with aspects of the disclosure, in certain embodiments the gates 1015 may be fabricated using tube hull sections, which may involve lower manufacturing costs. In further embodiments, the gate 1015 may comprise a metal-doped rubber material, which has the benefits of the elastic properties of most elastomers along with added, increased strength. In accordance with aspects of the disclosure, rubber will be able to mitigate large pressure differentials by deforming to a much greater extent than would conventional metals. In accordance with further aspects of the disclosure, metal strands and/or doped particles may be used to provide added strength and resilience to the gate material for continued use. In accordance with aspects of the disclosure, the natural ability of rubber to withstand large amounts of strain and not fail may have large benefits. As such, rubber may be a suitable material for use in the inflatable valves (and in some embodiments, the gate valves) of the present disclosure.

Figure 10D:
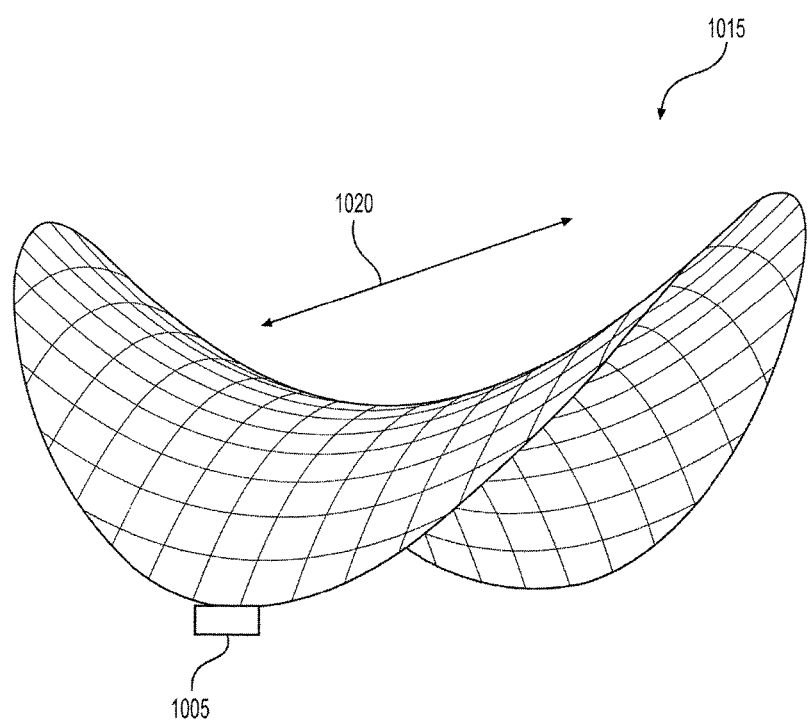

FIG. 10D schematically illustrates a perspective view of a hyperbolic paraboloid-shaped gate 1015 in accordance with aspects of the disclosure. As shown in FIG. 10D, when the gate 1015 is actuated (e.g., using an actuator 1005 such as those described above) to the open position, transportation path 1020 is not obstructed by the gate 1015.

Figure 11A:
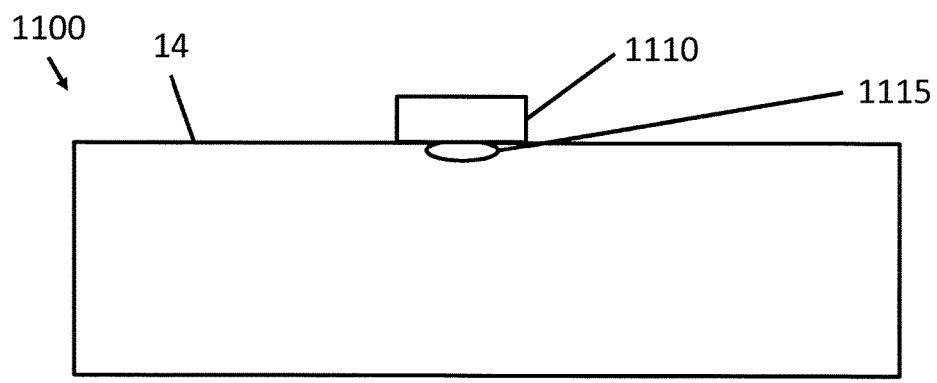
FIGS. 11A-11C are exemplary schematic depictions of an exemplary airbag valve in accordance with embodiments of the present disclosure.
Figure 11B:
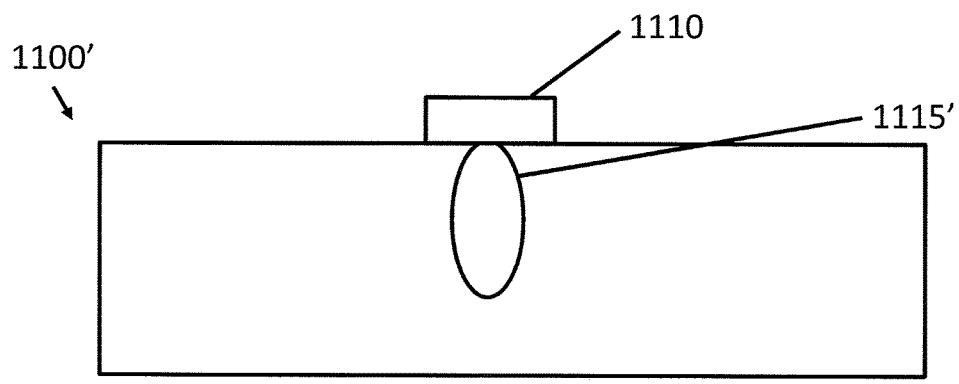
Figure 11C:
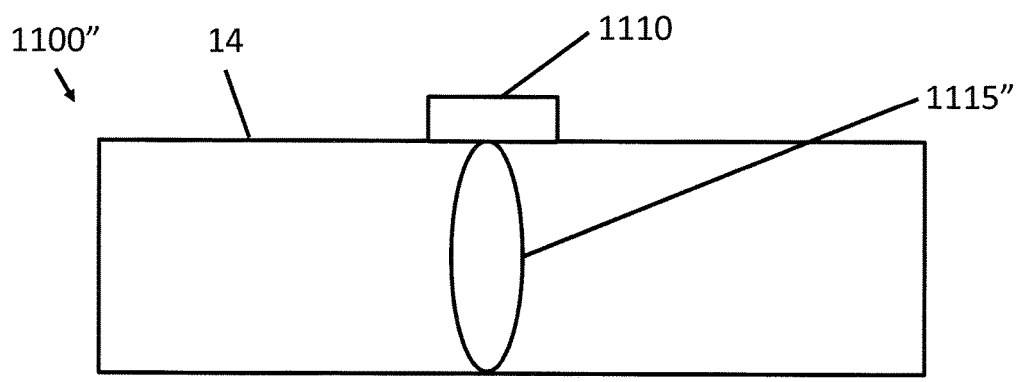

FIGS. 11A-11C are exemplary schematic depictions of an exemplary tube-deployed airbag valve 1100 in accordance with embodiments of the present disclosure. In certain embodiments, a durable, high pressure bladder (or airbag)

may be utilized as an airbag valve. In another embodiment, the airbag may comprise a soft, polymeric material that is embedded in the surface of the tube and which may be rapidly filled with gas, in a situation where quick containment may be necessary, such as an emergency, minimizing the re-pressurization of the tube from its low-pressure state. The bladder (or airbag) may be arranged (e.g., pre-arranged) in a wall of the tube in a pre-deployed state, and then be deployed when necessary. In accordance with aspects of the disclosure, utilizing airbags to create airlocks in the high-speed transportation system may be safer and/or softer (e.g., less impactful on the tubular structure) and quieter, may require less energy to actuate (e.g., deploy and un-deploy), may require less mass, and/or may utilize a smaller stored volume than utilizing a solid gate (e.g., a solid metal gate).

As schematically shown in FIG. 11A, an airbag valve 1100 includes an expandable airbag 1115, which is arranged in the tube 14 in an un-deployed state. An airbag filling mechanism 1110 is in fluid communication with the airbag valve 1100 and is configured and operable to fill the air bag 1115. In embodiments, the airbag filling mechanism 1110 may be an air pump, or a pre-charged gas canister. Additionally, as in certain embodiments, the ambient air (e.g., at atmospheric pressure) outside the tube 14 may be higher than the low-pressure environment in the interior of the tube 14, the airbag filling mechanism 1110 may comprise an actuatable opening in the tube to allow ambient air (e.g., at atmospheric pressure) to enter and fill the airbag 1115. The airbag filling mechanism 1110 may also be operable to deflate the airbag 1115, for example, after the airbag is no longer needed or desired. As such, the airbag filling mechanism 1110 may include, for example, a suitable pump to remove air from an inflated airbag. Additionally, while the airbag filling mechanism 1110 is shown arranged on an exterior of the tube 14, in embodiments, the airbag filling mechanism 1110 (or portions of the airbag filling mechanism 1110) may be arranged within an interior of the tube 14. The airbag valve 1100 also includes suitable controls (e.g., one or more processors) operable to receive instructions (e.g., from a nearby capsule, from a tube communication system, and/or at least one central control) and to instruct the airbag filling mechanism 1110 to fill the airbag 1115.

In embodiments, the airbag filling mechanism 1110 may also serve as a secure attachment point for the airbag 1115, configured to maintain the airbag 1115 in its relative position within the tube 14. While the exemplary embodiment of FIGS. 11A-11C depict an airbag valve 1100 structured and arranged to deploy from above, the disclosure contemplates other arrangements of the airbag valve 1100 (e.g., below the tube 14 or on one side of the tube 14). While, in the context of the present disclosure, the high pressure bladder is described as an airbag, this should not be construed as limiting the disclosed embodiments, and the disclosure contemplates that other fluids with suitable properties (e.g., other gases) may be used to inflate the airbag 1115.

FIG. 11B schematically illustrates the tube-deployed airbag valve 1100' in an intermediate arrangement, wherein the airbag 1115' is partially inflated in accordance with embodiments of the present disclosure. As shown in FIG. 11B, the airbag 1115' does not yet occupy the entire cross-sectional area of the tube 14. As the airbag filling mechanism 1110 continues to fill the airbag 115', the outer periphery of the airbag 115' expands within the tube 14 to close the gap there between.

FIG. 11C schematically illustrates the tube-deployed airbag valve 110'" in a deployed arrangement, wherein the airbag 1115" is arranged in the tube 14 to occupy and completely fill an entire cross-sectional area of the tube 14, so as to create an airlock in accordance with embodiments of the present disclosure. As schematically shown in FIG. 11C, the fully-deployed airbag 1115" is in contact with the interior wall of the tube around an entire interior periphery of the tube 14.

In accordance with aspects of the disclosure, in some embodiments the airbag 1115 (or bladder) may comprise a lightweight medium that is capable of maintaining a seal in the tubes 14 and/or in or around stations of the transportation system. In embodiments, the airbag 1115 may comprise a pressurized rubber inner core bladder with aramid external coatings, which, in accordance with aspects of the disclosure, can greatly reduce cost and weight of the airbag 1115. In certain embodiments, the airbag 1115 (or bladder) may be encased between layers of an aramid material. Additionally, in some embodiments, a Kevlar-like outer layer may be used to increase rigidity of the airbag 1115.

The disclosure contemplates that inflatable airbags (and the airlocks they create) may deform (e.g., highly deform) under pressure inside the tube 14 without an airbag support structure (e.g., an external or internal support structure). In some embodiments of the present disclosure, aramid fiber sheets encase an inflatable diaphragm of the airbag. In accordance with aspects of the disclosure, an aramid fibrous material has a high tensile capacity, which may be used to counter the forces received in and on the airbag.

By implementing aspects of the present disclosure, using an airbag comprising one or more aramid-type materials, the airlock system weight is greatly reduced as opposed to conventional airlocks. Moreover, in accordance with aspects of the disclosure, the time it takes to position the airlock device in the tube and create an airlock in the tube will also decrease when using a lighter airlock (e.g., an airbag airlock).

Figure 12A:
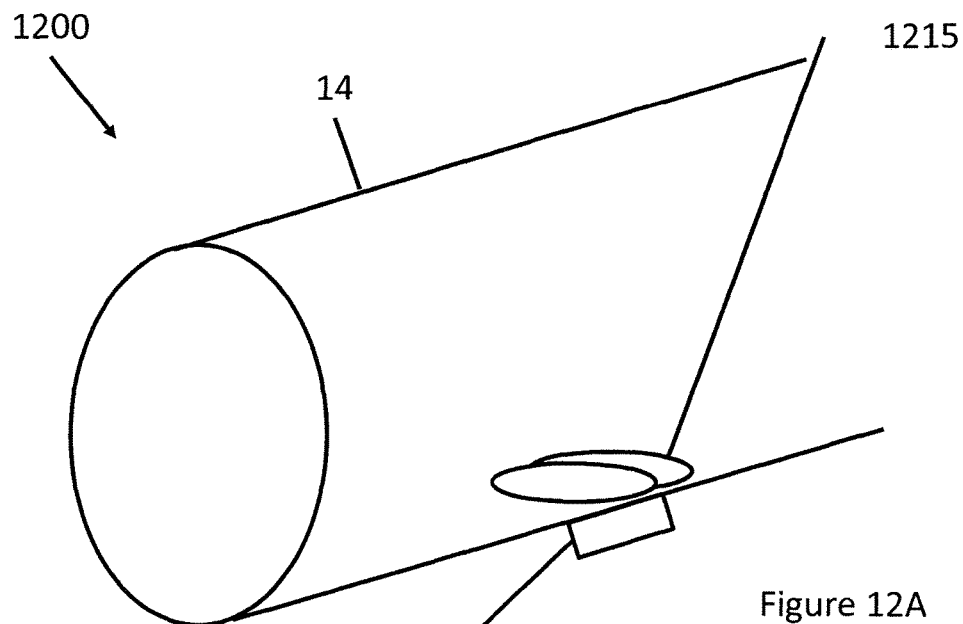
FIGS. 12A-12B are schematic perspective views of an exemplary airbag valve in accordance with embodiments of the present disclosure.
Figure 12B:
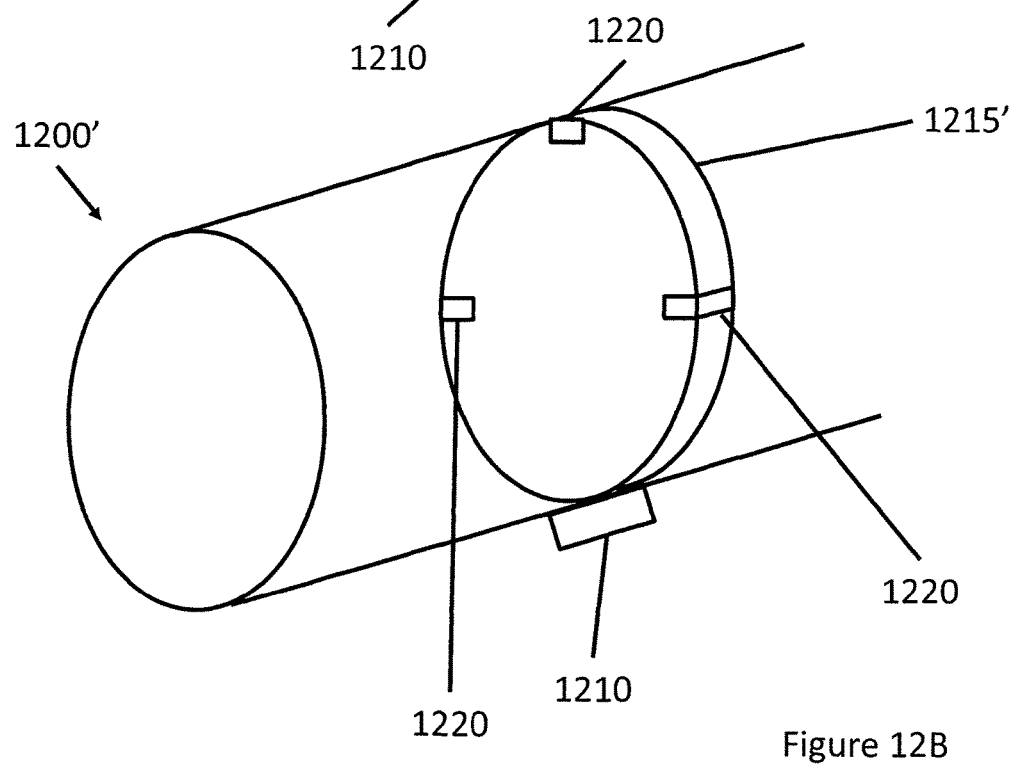

FIGS. 12A-12B are exemplary schematic perspective depictions of an exemplary airbag valve 1200 in accordance with embodiments of the present disclosure. As shown in FIG. 12A, an airbag 1215 is in an un-deployed state, and the passageway through the tube 14 is open and unobstructed. While the exemplary schematic depiction of FIG. 12A shows the airbag 1215 and airbag filling mechanism 1210 arranged on a bottom side of the tube 14, it should be understood that the airbag 1215 is structured and arranged so that it, when in an un-deployed state, the airbag 1215 (and any components of the airbag valve 1200) arranged in the tube 14 do not impede passage of a capsule (not shown) through the tube 14.

As shown in the airbag valve arrangement 1200' in FIG. 12B, the airbag 1215' is in a deployed state, and in sealing contact with an interior periphery of the tube 14. As shown with the exemplary embodiment of FIG. 12B, the airbag valve 1200 includes one or more sealing aids 1220 arranged on a periphery of the airbag 1215' (and/or within the airbag 1215'). In embodiments, the sealing aid 1220 may comprise a magnet configured to interact (e.g. magnetically attach) with the interior wall of the tube 14 (e.g., a steel tube). In some embodiments, the magnet may be an electromagnet (which may be actuatable to turn on or off the magnetization), and in other contemplated embodiments the magnet may be a passive magnet (and/or a mixture of electromagnets and passive magnets). When one or more electromagnets are utilized in the airbag valve 1200, the airbag valve 1200 may also include suitable controls and electrical connections to selectively actuate (e.g., power) the at least one electromagnet. In other contemplated embodiments, the sealing aid 1220 may comprise a releasable adhesive configured to adhere (e.g., temporarily) to an interior wall of the tube 14. In additional contemplated embodiments, the sealing aid 1220 may comprise an additional layer of material configured to enhance a seal between the airbag 1215' and the interior wall of the tube 14. While the exemplary embodiment of FIG. 12B depicts three sealing aids 1220 arranged approximately around a circumference of the airbag (e.g., when in a deployed state), the disclosure contemplates that the airbag 1215' may include any number of sealing aids 1220 (e.g., from one sealing aid 1220, for example, located opposite the airbag filling mechanism 1210, to six sealing aids 1220, to a continuous sealing aid arranged approximately around the entire circumference of the airbag 1215').

In some contemplated embodiments, one or more sensors (e.g., optical sensors) in communication with at least one capsule or at least one central control, may be utilized to prevent or delay actuation of a gate valve when a capsule is in close proximity to the gate valve.

Figure 13A:
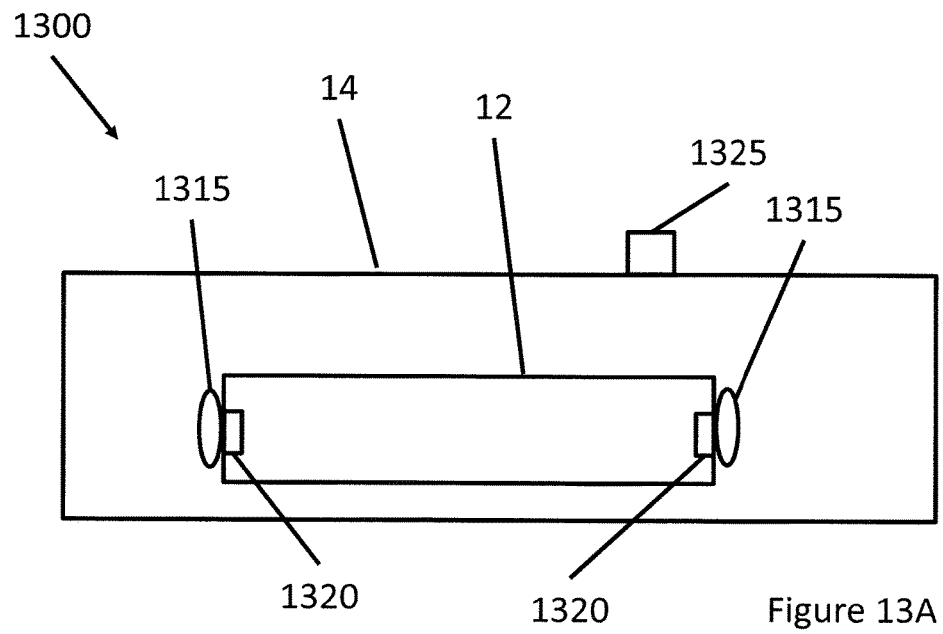
FIGS. 13A-13B are schematic views of an exemplary capsule airbag valve in accordance with embodiments of the present disclosure.
Figure 13B:
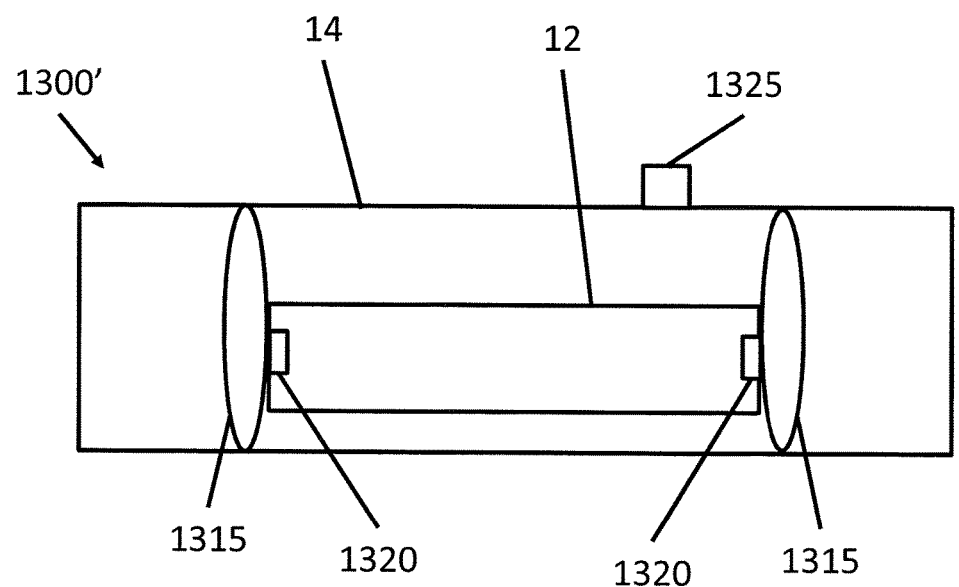

FIGS. 13A and 13B schematically depict different stages of deployment of a vehicle-based deployable airbag system 1300, 1300'. Some elements and embodiments of vehicle-based and/or tube based deployable airbags for high-speed transportation systems are discussed in related application Ser. No. 15/007,718, entitled "Deployable Decelerator," filed on even date herewith, the entire content of which is expressly incorporated by reference herein in its entirety.

As shown in FIG. 13A, a capsule 12 includes two vehicle-based deployable airbags 1315 at least one at each end of the capsule 12, that are in an uninflated state. While the airbags 1315 are depicted as being arranged on the surface of the capsule 12, in embodiments, the airbags (when uninflated) may be arranged, for example, within a wall of the capsule 12 or within the capsule 12. The deployable airbag system 1300 also includes airbag inflation devices 1320 arranged on the capsule, which are configured to inflate the deployable airbags 1315. As shown in FIG. 13A, neither of airbags 1315 is deployed, and the passageway for the capsule 12 through the tube 14 is unobstructed.)

As shown in FIG. 13B, the airbags 1315 have been deployed and inflated so as to form two airlocks in the tube 14. In such a manner, the capsule 12 is sealed off from the low-pressure environment of the tube 14. In certain embodiments, the tube may include at least one escape hatch 1325 configured to permit egress from and/or ingress into the tube 14. In an emergency situation, for example, the capsule 12 may be controlled to stop in proximity to such an escape hatch 1325, and the airbags 1315 may be deployed to create air locks around the capsule 12. Then, the sealed section of the tube can be re-pressurized (e.g., by opening the escape hatch 1325) and the escape hatch 1325 can be used to remove the passengers from the capsule 12 and/or permit emergency workers and/or maintenance workers into the tube 14.

In further contemplated embodiments, a vehicle-based deployable airbag may be deployed in two or more stages, wherein with a first stage, the airbag is operable to inflate to a partial extent (e.g., not filling the tube cross-section) so as to assist in decelerating the capsule. With a subsequent stage, the airbag is operable to be completely inflated, so as to fill the tube cross-section and create an air seal.

In further contemplated embodiments, vehicle-based and/or tube based deployable airbags or (a plurality of hand-carried airbag deployers, for example) may be used to seal off a region of the tube (e.g., a smaller region) so that a human can access the interior of the tube. For example, a plurality of tube-based deployable airbags may be activated in a region of an access port (e.g., a man access port). In accordance with aspects of the disclosure, this allows an individual to enter into a chamber that re-pressurizes (e.g., to the outside ambient pressure), allowing individual access to the larger tube without sacrificing the internal depressurization of the tube. With a vehicle-based deployable airbag embodiment, a maintenance worker, for example, may travel in the capsule to a region requiring maintenance, deploy the vehicle-based deployable airbags to create airlocks around the region requiring maintenance, de-pressurize the portion of the tube between the two airlocks, and exit the capsule vehicle to provide any necessary maintenance.

Figure 14:
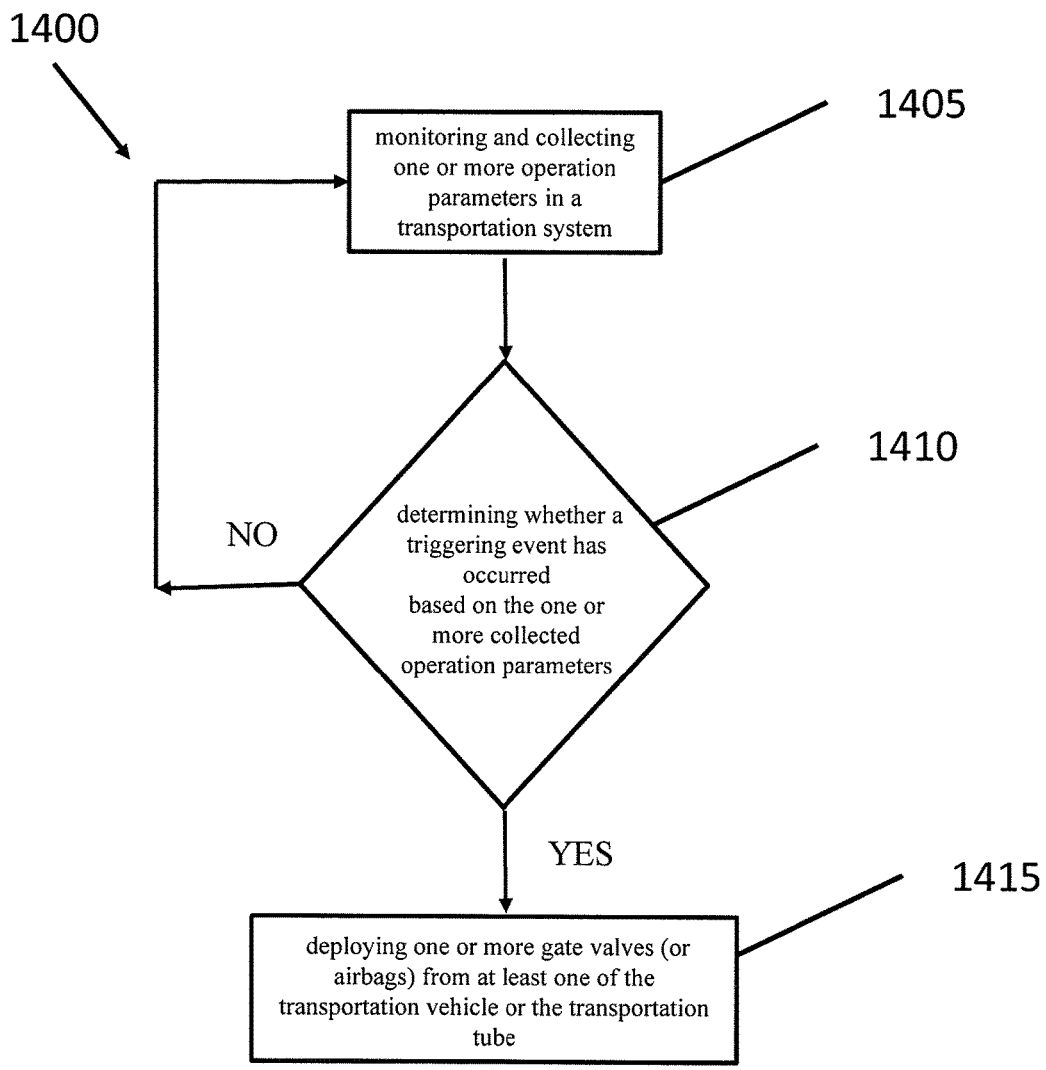
FIG. 14 depicts an exemplary process for deploying a gate valve (or airbag valve) in accordance with embodiments of the present disclosure.

FIG. 14 depicts an exemplary process 1400 for deploying a gate valve (or airbag valve) in accordance with embodiments of the present disclosure. Some aspects of the processors system environments are discussed in related application Ser. No. 15/007,783, entitled "Transportation System, filed on even date herewith, the entire content of which has been expressly incorporated by reference herein in its entirety.

At step 1405, a gate valve (or airbag) controller (e.g., comprising one or more processors) is operable to monitor and/or receive one or more operation parameters of a transportation system. At step 1410, the gate valve (or airbag) controller is operable to determine (e.g., detect) whether a gate valve deployment triggering event has occurred. For example, the gate valve (or airbag) controller may detect a loss of the low-pressure environment, or may receive a triggering signal from a suitable sensor (e.g., a pressure sensor). If, at step 1410, gate valve (or airbag) controller detects a gate valve deployment triggering event, at step 1415, the gate valve (or airbag) controller is operable to deploy one or more gate valves (or airbags) arranged in the transportation system (e.g., on a capsule or within the tube structure). If, at step 1410, gate valve (or airbag) controller does not detect a gate valve deployment triggering event, the process continues at step 1405.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such terms intended to be inclusive in a manner similar to the term "comprising" as "comprising" is interpreted when employed as a transitional word in a claim.

While the invention has been described with reference to specific embodiments, those skilled in the art will understand that various changes may be made and equivalents may be substituted for elements thereof without departing from the true spirit and scope of the invention. While exemplary embodiments are described above, it is not intended that these embodiments describe all possible forms of the invention. Rather, the words used in the specification are words of description rather than limitation, and it is understood that various changes may be made without departing from the spirit and scope of the disclosure. In addition, modifications may be made without departing from the essential teachings of the invention. Furthermore, the features of various implementing embodiments may be combined to form further embodiments of the invention.

What is claimed is:

1. A system comprising:
    at least one tube forming a portion of a transportation path, wherein the tube is maintained as a low-pressure environment;
    a propulsion system configured to propel at least one capsule through the tube;
    a levitation system configured to levitate the capsule within the tube; and
    at least one tube sealer arranged along the at least one tube and configured to selectively create an airlock in the at least one tube,
    wherein the at least one tube sealer comprises a gate valve having a gate that is moveable into the transportation path to create the airlock in the at least one tube, and
    wherein the gate valve comprises at least one flange configured for attachment to the at least one tubs.

2. The system of claim 1, wherein the gate valve additionally comprises a gate housing configured to accommodate the gate.

3. The system of claim 2, wherein the gate housing includes reinforcement structures to increase a strength and/or stiffness of the gate housing.

4. The system of claim 1, wherein the gate valve additionally comprises at least one gate actuator configured to selectively move the gate at least one of into and out of the transportation path.

5. The system of claim 1, wherein the gate valve additionally comprises at least one gate guide within which the gate in operable to move into the transportation path to create the airlock in the at least one tube.

6. The system of claim 1, wherein the gate valve is linearly actuated into an operative position to create the airlock in the at least one tube.

7. The high-speed transportation system of claim 6, wherein the gate valve is linearly actuated in one direction into an operative position to create the airlock in the at least one tube.

8. The system of claim 1, wherein the gate valve is rotationally actuated into an operative position to create the airlock in the at least one tube.

9. The high-speed transportation system of claim 1, wherein the gate valve comprises an iris-type aperture.

10. A system comprising:
at least one tube forming a portion of a transportation path, wherein the tube is maintained as a low-pressure environment;
a propulsion system configured to propel at least one capsule through the tube;
a levitation system configured to levitate the capsule within the tube; and
at least one tube sealer arranged along the at least one tube and configured to selectively create an airlock in the at least one tube,
wherein the at least one tube sealer comprises a gate valve having a gate that is moveable into the transportation path to create the airlock in the at least one tube,
wherein the gate valve additionally comprises at least one gate actuator configured to selectively move the gate at least one of into and out of the transportation path, and
wherein at least one gate actuator comprises at least two gate actuators, wherein one gate actuator is configured to move the gate in a direction perpendicular to a direction of the transportation path, and wherein a second gate actuator is configured to move the gate in a direction parallel to the direction of the transportation path.

11. A system comprising:
at least one tube forming a portion of a transportation path, wherein the tube is maintained as a low-pressure environment;
a propulsion system configured to propel at least one capsule through the tube;
a levitation system configured to levitate the capsule within the tube; and
at least one tube sealer arranged along the at least one tube and configured to selectively create an airlock in the at least one tube,
wherein the at least one tube sealer comprises a gate valve having a gate that is moveable into the transportation path to create the airlock in the at least one tube, and
wherein the gate valve comprises a wedge-shaped gate.

12. A system comprising:
at least one tube forming a portion of a transportation path, wherein the tube is maintained as a low-pressure environment;
a propulsion system configured to propel at least one capsule through the tube;
a levitation system configured to levitate the capsule within the tube; and
at least one tube sealer arranged along the at least one tube and configured to selectively create an airlock in the at least one tube,
wherein the at least one tube sealer comprises a gate valve having a gate that is moveable into the transportation path to create the airlock in the at least one tub, and
wherein the gate includes a track-gap support surface that is structured and arranged to reduce a size of a gap in the transportation path when the gate is maintained in a gate storage area.

13. A system comprising:
at least one tube forming a portion of a transportation path, wherein the tube is maintained as a low-pressure environment;
a propulsion system configured to propel at least one capsule through the tube;
a levitation system configured to levitate the capsule within the tube; and
at least one tube sealer arranged along the at least one tube and configured to selectively create an airlock in the at least one tube,
wherein the at least one tube sealer comprises a gate valve having a gate that is moveable into the transportation path to create the airlock in the at least one tube, and
wherein the gate valve includes a bridging element that is structured and arranged to reduce a size of a gap formed between adjacent tubes.

14. The system of claim 13, further comprising an actuator configured for moving the bridging element from a recessed position to a position within the gap.

15. A system comprising:
at least one tube forming a portion of a transportation path, wherein the tube is maintained as a low-pressure environment;
a propulsion system configured to propel at least one capsule through the tube;
a levitation system configured to levitate the capsule within the tube; and
at least one tube sealer arranged along the at least one tube and configured to selectively create an airlock in the at least one tube,
wherein the at least one tube sealer comprises a hyperbolic paraboloid-shaped sealing element that is positionable in the transportation path to create the airlock in the at least one tube.

16. A system comprising:
at least one tube forming a portion of a transportation path, wherein the tube is maintained a low-pressure environment;
a propulsion system configured to propel at least one capsule through the tube;
a levitation system configured to levitate the capsule within the tube; and
at least one tube sealer arranged along the at least one tube and configured to selectively create an airlock in the at least one tube,
wherein the at least one tube sealer comprises an airbag that is inflatable in the transportation path to create the airlock in the at least one tube, and
wherein the airbag is a capsule-based airbag comprising an airbag arranged on each longitudinal end of a capsule traversing the at least one tube.

17. The system of claim 16, wherein the airbag comprises at least one sealing aid.

18. A system comprising:
- at least one tube forming a portion of a transportation path, wherein the tube is maintained as a low-pressure environment;
- a propulsion system configured to propel at least one capsule through the tube;
- a levitation system configured to levitate the capsule within the tube; and
- at least one tube sealer arranged along the at least one tube and configured to selectively create an airlock in the at least one tube,
- wherein the at least one tube sealer comprises a gate valve having a gate that is moveable into the transportation path to create the airlock in the at least one tub,
- wherein the gate valve is linearly actuated into an operative position to create the airlock in the at least one tube, and
- wherein the gate valve is linearly actuated in two discrete directions into an operative position to create the airlock in the at least one tube.

* * * * *